(12) United States Patent
Thackeray et al.

(10) Patent No.: US 7,732,096 B2
(45) Date of Patent: *Jun. 8, 2010

(54) LITHIUM METAL OXIDE ELECTRODES FOR LITHIUM BATTERIES

(75) Inventors: Michael M. Thackeray, Naperville, IL (US); Christopher S. Johnson, Naperville, IL (US); Khalil Amine, Downers Grove, IL (US); Sun-Ho Kang, Naperville, IL (US)

(73) Assignee: Uchicago Argonne, LLC, Chicago, IL (US)

( * ) Notice: Subject to any disclaimer, the term of this patent is extended or adjusted under 35 U.S.C. 154(b) by 1113 days.

This patent is subject to a terminal disclaimer.

(21) Appl. No.: 11/378,145

(22) Filed: Mar. 16, 2006

(65) Prior Publication Data
US 2006/0188781 A1    Aug. 24, 2006

Related U.S. Application Data

(63) Continuation-in-part of application No. 10/825,931, filed on Apr. 15, 2004, now Pat. No. 7,314,682.

(60) Provisional application No. 60/465,034, filed on Apr. 24, 2003.

(51) Int. Cl.
*H01M 4/48*    (2006.01)
*H01M 4/50*    (2006.01)
*H01M 4/52*    (2006.01)
*C01G 45/12*    (2006.01)
*C01D 1/04*    (2006.01)

(52) U.S. Cl. .............. 429/231.1; 429/223; 429/224; 429/231.3; 429/231.5; 429/231.6; 429/594.15; 429/594.4; 429/599

(58) Field of Classification Search .............. 429/223, 429/224, 231.1, 231.3, 231.5, 231.6; 423/594.15, 423/594.4, 599
See application file for complete search history.

(56) References Cited

U.S. PATENT DOCUMENTS

| 5,240,794 | A | 8/1993 | Thackeray et al. |
| 6,677,082 | B2 * | 1/2004 | Thackeray et al. .......... 429/224 |
| 6,680,143 | B2 * | 1/2004 | Thackeray et al. .......... 429/224 |

(Continued)

OTHER PUBLICATIONS

Gummow, R.J. Liles, D.C. and Thackeray M. M., Lithium Extraction From Orthorhombic Lithium Manganese Oxide and the Phase Transformation to Spinel, Mat. Res. Bull., vol. 28 pp. 1249-1256 (1993).

(Continued)

*Primary Examiner*—Stephen J. Kalafut
(74) *Attorney, Agent, or Firm*—Olson & Cepuritis, Ltd

(57) ABSTRACT

An uncycled preconditioned electrode for a non-aqueous lithium electrochemical cell including a lithium metal oxide having the formula $xLi_2-yH_yO.xM'O_2.(1-x)Li_1-zH_zMO_2$ in which $0<x<1$, $0<y<1$ and $0<z<1$, M is a non-lithium metal ion with an average trivalent oxidation state selected from two or more of the first row transition metals or lighter metal elements in the periodic table, and M' is one or more ions with an average tetravalent oxidation state selected from the first and second row transition metal elements and Sn. The $xLi_2-yH_y.xM'O_2.(1-x)Li_1-zH_zMO_2$ material is prepared by preconditioning a precursor lithium metal oxide (i.e., $xLi_2M'O_3.(1-x)LiMO_2$) with a proton-containing medium with a pH<7.0 containing an inorganic acid. Methods of preparing the electrodes are disclosed, as are electrochemical cells and batteries containing the electrodes.

19 Claims, 17 Drawing Sheets

U.S. PATENT DOCUMENTS 7,135,252 B2 * 11/2006 Thackeray et al. ....... 429/231.1
7,314,682 B2 * 1/2008 Thackeray et al. .......... 429/223

OTHER PUBLICATIONS

Amatucci, G.G., Blyr, A., Sigala, C. Alfonse, P. and Tarascon, J.M., Surface Treatments of Li(1+x)Mn(2-x)O(4) Spinels For Improved Elevated Temperature Performance, Solid State Ionics 104, 13-25 (1997).

Cho, J. Kim, G.B., Lim, H.S., Kim, C.S. and Yoo, S.I., Improvement of Structural Stability on 55 C Cycling by Sol-Gel Coating of LiCoO2, Electrochem and Solid State Letters, 2 (12), 607 1999).

Cho, Jaephil, Kim, Yong Jeong and Park, Byungwoo, Novel LiCoO2 Cathode Material With Al2O3 Coating For A Li Ion Cell, American Chemical Society, Chem. Mater. 2000, 12, 3788-3791.

Cho, Jaephil, Kim, Yong Jeong, Kim, Tae-Joon, and Park, Byungwoo, Zero Strain Intercalation Cathode For Rechargeable Li-Ion Cell, Angew, Chem. Int. Ed., 40 (18) 3367 (2001).

Cho, Jaephil, Kim, Yong Jeong, Kim, Tae-Joon, and Park, Byungwoo, High-Performance ZrAO2-Coated LiNiO2 Cathode Material, Electrochemical and Solid State Letters, 4 (10) A159-A161 (2001).

Cho, Jaephil, Kim, Yong Jeong, Kim, Tae-Joon, and Park, Byungwoo, The Effect of Al2O3 Coating On the Cycle Life Performance in Thin-Film LiCoO2 Cathodes, Journal of the Electrochemical Society, 149 (10) A1337-A1341 (2002).

Chen, Zhaohui and Dahn, J.R., Effect of a ZrO2 Coating on the Structure and Electrochemistry of LixCoO2 When Cycled to 4.5V, Electrochemical and Solid State Letters, 5 (10) A213-A216 (2002).

Numata, K. et al. Solid State Ionics, vol. 118, p. 117-120 (1999).

Rossouw M.H. et. al., Journal of Solid State Chemistry, vol. 104, p. 464 (1993).

B. Amundsen et al., Journal of the Electrochemical Society, vol. 149 (4), p. A431-436 (2002).

Z. Lu et al., Chemistry of Materials, vol. 15, p. 3214 (2003).

J.S. Kim et al., Electrochemistry Communications, vol. 4, pp. 205-209 (2002).

* cited by examiner

LITHIUM METAL OXIDE ELECTRODES FOR LITHIUM BATTERIES

RELATED APPLICATIONS

This application is a continuation-in-part of application Ser. No. 10/825,931 filed Apr. 15, 2004, now U.S. Pat. No. 7,314,682, which application claims priority based on application Ser. No. 60/465,034 filed Apr. 24, 2003.

CONTRACTUAL ORIGIN OF THE INVENTION

The United States Government has rights in this invention pursuant to Contract No. W-31-109-ENG-38 between the U.S. Department of Energy and The University of Chicago representing Argonne National Laboratory.

FIELD OF THE INVENTION

This invention relates to improved lithium-metal-oxide positive electrodes for lithium cells and batteries, preferably rechargeable lithium-ion cells and batteries. These batteries are used to power a wide range of applications such as portable telecommunications equipment, computers, medical devices, electric vehicles and hybrid-electric vehicles. More specifically, the invention relates to lithium-metal-oxide electrodes with layered-type structures that are chemically preconditioned prior to cell assembly to improve the capacity, cycling efficiency and stability of lithium cells and batteries when charged to high potentials.

BACKGROUND OF THE INVENTION

State-of-the-art lithium-ion cells have a lithiated carbon negative electrode, or anode, $(Li_xC_6)$ and a lithium-cobalt-oxide positive electrode, or cathode, $Li_{1-x}CoO_2$. During charge and discharge of the cells, lithium ions are transported between the two host structures of the anode and cathode with the simultaneous oxidation or reduction of the host electrodes, respectively. When graphite is used as the anode, the voltage of the cell is approximately 4 V. The $LiCoO_2$ cathode, which has a layered structure, is expensive and becomes unstable at low lithium content, i.e., when cells reach an overcharged state at $x \geq 0.5$. Alternative, less expensive electrode materials that are isostructural with $LiCoO_2$, such as $LiNi_{0.8}Co_{0.2}O_2$, $LiNi_{0.5}Mn_{0.5}O_2$ and $LiMn_{0.33}Ni_{0.33}Co_{0.33}O_2$ are being developed with the hope of replacing at least part of the cobalt component of the electrode. However, all these layered structures, when extensively delithiated become unstable, because of the high oxygen activity at the surface of the particles. Therefore, the delithiated electrode particles tend to react with the organic solvents of the electrolyte or lose oxygen. Such reactions at the surface of layered lithium metal oxide electrodes are detrimental to the performance of the lithium cells and batteries, and methods are required to combat these reactions to ensure that maximum capacity and cycle life can be obtained from the cells.

Considerable efforts have already been made in the past to overcome the stability and solubility problems associated with layered $LiCoO_2$ and $LiNiO_2$ electrodes. For example, considerable success has been achieved in the past by stabilizing these electrodes by pre-treating the electrode powders with oxide additives such as $Al_2O_3$ or $ZrO_2$ obtained from metal alkoxide precursors such as solutions containing aluminum ethylhexanoate diisopropoxide $(Al(OOC_8H_{15})(OC_3H_7)_2)$ or zirconium ethylhexanoisopropoxide $(Zr[(OOC_8H_{15})_2(OCH_3H_7)_2])$ as described, for example, by J. Cho et al in Chemistry of Materials, Volume 12, page 3788 (2000) and J. Cho et al in Electrochemical and Solid State Letters, Volume 4 No. 10, page A159 (2001), respectively, or a zirconium oxide, polymeric precursor or zirconium oxynitrate $(ZrO(NO_3)_2.xH_2O)$ as described by Z. Chen et al in Electrochemical and Solid State Letters, Volume 5, No. 10, page A213 (2002), prior to the fabrication of the final electrode thereby making the surface of the $LiCoO_2$ particles more resistant to electrolyte attack, cobalt dissolution or oxygen loss effects.

The loss of oxygen from lithium metal oxide electrodes, such as layered $LiCoO_2$ and $LiNi_{1-y}Co_yO_2$ electrodes can contribute to exothermic reactions with the electrolyte and with the lithiated carbon negative electrode, and subsequently to thermal runaway if the temperature of the cell reaches a critical value. Although some success has been achieved in the past to improve the performance of lithium-ion cells by coating electrode particles, the coatings can themselves impede lithium diffusion in and out of the layered electrode structure during electrochemical discharge and charge. Further improvements in the composition of layered lithium-metal oxide electrodes, particularly at the surface of the electrodes, and in methods to manufacture them are still required to improve the overall performance and safety of lithium cells.

SUMMARY OF THE INVENTION

This invention relates to improved lithium-metal-oxide positive electrodes for lithium cells and batteries, preferably rechargeable lithium-ion cells and batteries. More specifically, it relates to layered lithium-metal-oxide electrodes, represented by the general formula $xLi_2M'O_3.(1-x)LiMO_2$ ($0 \leq x < 1$) in which M' is one or more non-lithium metal ions with an average tetravalent oxidation state and in which M is two or more non-lithium metal ions with an average trivalent oxidation state that are chemically preconditioned prior to cell assembly either by reduction or by acid treatment, or a combination thereof, to improve the capacity, cycling efficiency and cycling stability of lithium cells and batteries when charged to high potentials. The invention extends to methods for synthesizing the preconditioned lithium-metal-oxide electrodes.

BRIEF DESCRIPTION OF THE DRAWINGS

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

b) a $0.1Li_2MnO_3 \cdot 0.9LiCo_{0.372}Ni_{0.372}Mn_{0.256}O_2$ electrode treated with an acidic 0.014M $NH_4F$ (aqueous) solution and dried at 300° C. in air (Sample I);

c) a $0.1Li_2MnO_3 \cdot 0.9LiCo_{0.372}Ni_{0.372}Mn_{0.256}O_2$ electrode treated with an acidic 0.014M NH4F (aqueous) solution and dried at 600° C. in air (Sample J);

d) a $0.1Li_2MnO_3 \cdot 0.9LiCo_{0.372}Ni_{0.372}Mn_{0.256}O_2$ electrode treated with a 0.016M $NH_4F$ solution in methanol and dried at 600° C. in air (Sample K).

Figure 14:
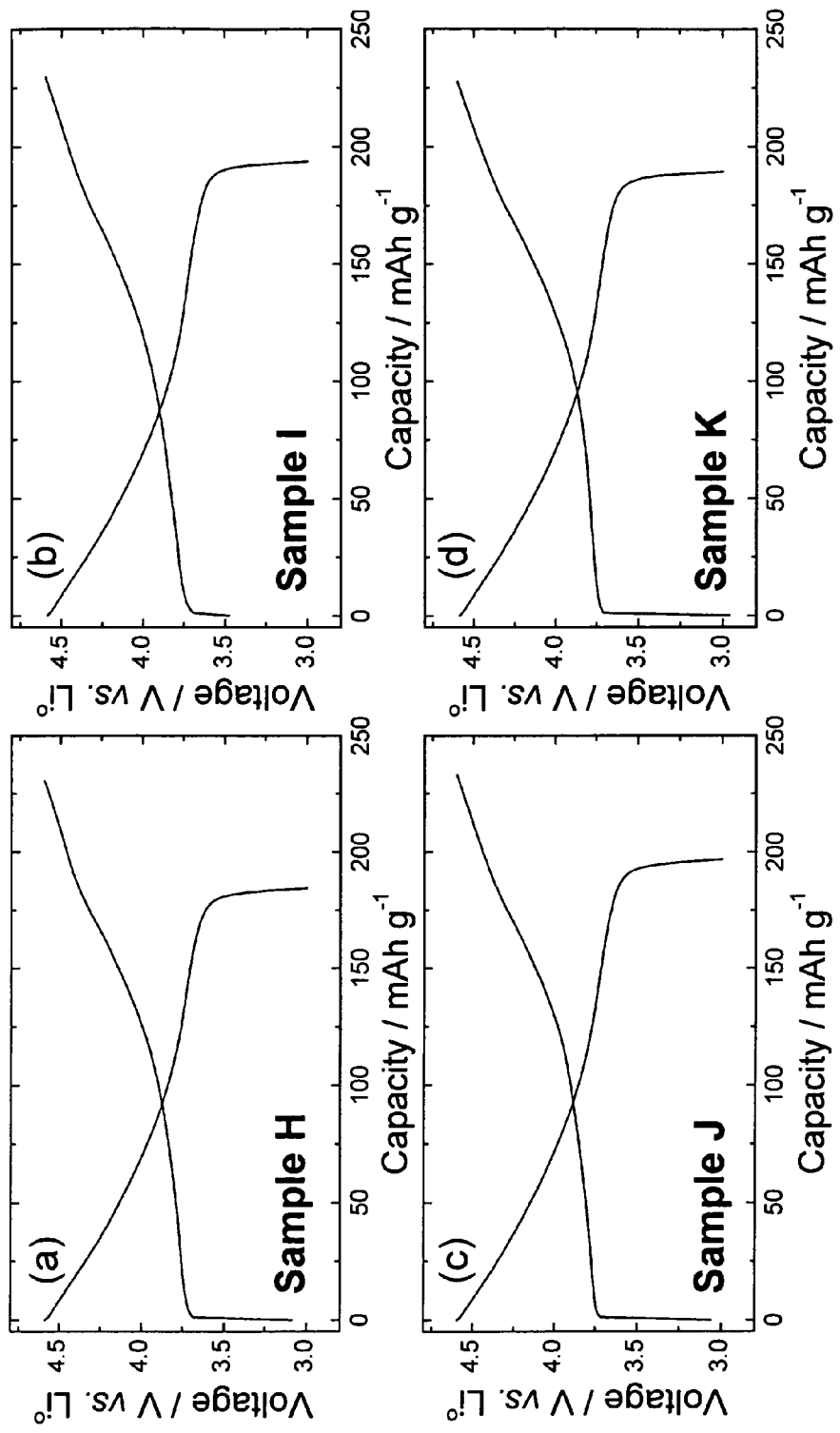

FIG. 14 illustrates the first charge and discharge voltage profiles of lithium cells, operated at room temperature, with a) an untreated $1Li_2MnO_3 \cdot 0.9LiCo_{0.372}Ni_{0.372}Mn_{0.256}O_2$ electrode (Sample H); b) a $0.1Li_2MnO_3 \cdot 0.9LiCo_{0.372}Ni_{0.372}Mn_{0.256}O_2$ electrode treated with an acidic $NH_4F$ solution (aqueous) and dried at 300° C. (Sample I); c) a $0.1Li_2MnO_3 \cdot 0.9LiCo_{0.372}Ni_{0.372}Mn_{0.256}O_2$ electrode treated with an acidic $NH_4F$ solution (aqueous) and dried at 600° C. (Sample J); and d) a $0.1Li_2MnO_3 \cdot 0.9LiCo_{0.372}Ni_{0.372}Mn_{0.256}O_2$ electrode treated with a 0.016M $NH_4F$ solution in methanol and dried at 600° C. in air (Sample K).

Figure 15:
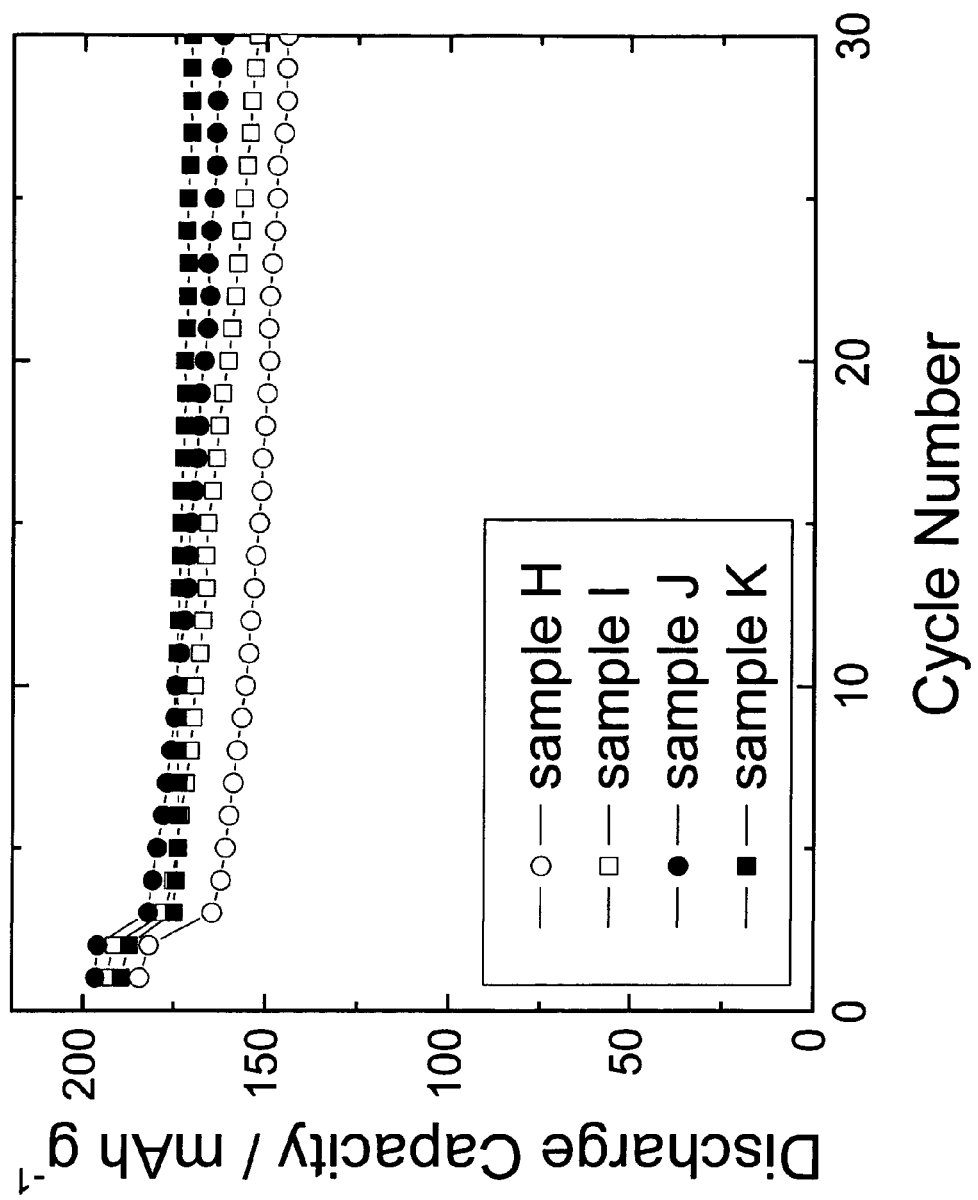

FIG. 15 illustrates plots of electrode capacity vs. cycle number of a lithium cell, operated at room temperature between 4.6 and 3.0 V with an untreated $1Li_2MnO_3 \cdot 0.9LiCo_{0.372}Ni_{0.372}Mn_{0.256}O_2$ electrode (O), (Sample H); a $0.1Li_2MnO_3 \cdot 0.9LiCo_{0.0372}Ni_{0.372}Mn_{0.256}O_2$ electrode treated with an acidic $NH_4F$ solution (aqueous) and dried at 300° C. (□), (Sample I); a $0.1Li_2MnO_3 \cdot 0.9LiCo_{0.372}Ni_{0.372}Mn_{0.256}O_2$ electrode treated with an acidic $NH_4F$ solution (aqueous) and dried at 600° C., (●) (Sample J); and a $0.1Li_2MnO_3 \cdot 0.9LiCo_{0.372}Ni_{0.372}Mn_{0.256}O_2$ electrode treated with a 0.016M $NH_4F$ solution (aquesous) and dried at 600° C., (●) (sample J); and a $0.1Li_2MnO_3 \cdot 0.9LiCo_{0.372}Ni_{0.372}Mn_{0.256}O_2$ electrode treated with a 0.016M $Nh_4F$ solution in methanol and dried at 600° C. in air, (■) (Sample K).

DETAILED DESCRIPTION OF PREFERRED EMBODIMENTS

It is now well known that state-of-the-art $LiMO_2$ electrodes with layered structures such as $LiCoO_2$, $LiNi_{0.08}Co_{0.2}O_2$, $LiAl_{0.05}Ni_{0.80}Co_{0.15}O_2$, $LiNi_{0.5}Mn_{0.5}O_2$, $LiMn_{0.33}Ni_{0.33}Co_{0.33}O_2$, $LiNi_{0.80}Co_{0.15}Al_{0.05}O_2$ and $LiCo_{0.90}Ti_{0.05}Mg_{0.05}O_2$ electrodes, or variations thereof, for example, those that contain lithium within the transition metal (M) layers are unstable in a lithium cell environment when a large amount of lithium is extracted from their structures, typically when x exceeds 0.5 in $Li_{1-x}MO_2$ electrodes, or at a potential higher than approximately 4.2 V vs. metallic lithium. The high reactivity of the delithiated electrode structure has been attributed to the highly oxidizing power of the tetravalent metal ions $Ni^{4+}$, $Co^{4+}$ and $Mn^{4+}$, that decreases in the order $Ni^{4+} > Co^{4+} > Mn^{4+}$. Highly delithiated $Li_{1-x}MO_2$ electrodes can therefore react spontaneously with the organic-based electrolyte solvents such as ethylene carbonate, diethyl carbonate or dimethyl carbonate or, in extreme cases, the $Li_{1-x}MO_2$ electrode can release oxygen into the cell compartment. The oxidation of electrolyte solvents or the release of oxygen from the delithiated electrodes, which can be represented generically by the formula $Li_{1-x}MO_{2-\delta}$ (0<δ<1), must of necessity lower the oxidation state of the transition metal ions in the $Li_{1-x}MO_{2-\delta}$ product, at least at the surface of the electrode particles. Such a reaction takes place predominantly during the initial charge of a $C_6/LiMO_2$ lithium-ion cell, when lithium is electrochemically extracted from the $LiMO_2$ positive electrode and inserted into the negative $C_6$ (graphite) electrode. These reactions decrease the theoretical capacity of the $LiMO_2$ electrode; therefore, these electrodes tend to show an enhanced capacity loss on the initial charge/discharge cycle of the lithium-ion cell.

For layered $LiMO_2$ electrodes that contain Ni, such as $LiNiO_2$, $LiNi_{0.08}Co_{0.2}O_2$ and $LiAl_{0.05}Ni_{0.80}Co_{0.15}O_2$, it has been observed that the electrochemically induced capacity loss can be attributed not only to oxygen loss or reaction with the electrolyte, but also to the migration of the nickel ions into the lithium layer of the delithiated $Li_{1-x}MO_{2-\delta}$ electrode structure. When nickel diffusion occurs concomitantly with oxygen loss, then the surface of a $Li_{1-x}MO_{2-\delta}$ electrode can have characteristic features, for example, of a $Li_{1-x}MO_{2-\delta}$ rocksalt-like structure. For example, lithium extraction and oxygen loss from a $Li_{1-x}NiO_{2-\delta}$ electrode leaves a surface product that closely resembles a $Li_zNi_{1-z}O$ phase. Although a $Li_zNi_{1-z}O$ structure lowers the lithium-ion conductivity at the electrode surface, which can result in an increase in cell impedance, the reduced surface layer serves to protect the $Li_{1-x}MO_2$ structure within the bulk of the particles during the extended cycling of the lithium-ion cell. The applicants have found that it is advantageous to pre-reduce chemically the surface of $LiMO_2$ electrode particles, particularly those containing a slight excess of lithium within the M layers, with a convenient reducing agent to yield a $LiMO_{2-\delta}$ electrode product prior to cell assembly so that the extent of oxygen loss from the electrode and the concomitant loss of capacity could be minimized during the electrochemical charge and discharge of the cell. In this respect, the use of reducing environments to synthesize electrode products has already been disclosed in the literature for different types of electrodes as discussed by M. M. Thackeray et al in U.S. Pat. No. 5,240,794; in these instances the reduced metal ions exist in the bulk of the electrode structures as well as at the surface of the particles.

Layered lithium-metal-oxide structures, $Li_2M'O_3$, in which the M' ions are tetravalent, are also known to exist. These structures can be reformulated in standard layered notation as $Li[M'_{0.67}Li_{0.33}]O_2$ in which layers of lithium ions alternate with layers containing both M'- and lithium ions in a 2:1 ratio. One well known example is $Li_2MnO_3$ (Li$[Mn_{0.67}Li_{0.33}]O_2$) which is electrochemically inactive with respect to lithium insertion and extraction. However, $Li_2MnO_3$ can be electrochemically activated by acid treatment, during which some $H^+$—$Li^+$ ion exchange occurs and some $Li_2O$ may be removed from the structure.

This invention relates, in general, to layered lithium-metal-oxide electrodes, represented by the general formula $xLi_2M'O_3 \cdot (1-x)LiMO_2$ (0≦x<1) in which M' is one or more non-lithium metal ions with an average tetravalent oxidation state and in which M is one or more non-lithium metal ions with an average trivalent oxidation state that are chemically preconditioned prior to cell assembly either by reduction or by acid treatment, or a combination thereof, to improve the capacity, cycling efficiency and cycling stability of lithium cells and batteries when charged to high potentials. The invention extends to methods for synthesizing the preconditioned lithium-metal-oxide electrodes. When x=0, the formula $xLi_2M'O_3 \cdot (1-x)LiMO_2$ reduces simply to $LiMO_2$.

Therefore, in a first embodiment, this invention relates to layered electrodes represented by the two-component formula $xLi_2M'O_3 \cdot (1-x)LiMO_2$ in which 0≦x<1, that can be rewritten alternatively as $Li_{(2+2x)/(2+x)}M'_{2x/(2+x)}M_{(2-2x)/(2+x)}O_2$ also for 0≦x<1, in which M is a non-lithium metal ion with an average trivalent oxidation state selected from one or more of the first row transition metals or lighter metal elements in the periodic table, and in which M' is one or more ions with an average tetravalent oxidation state selected from the first and second row transition metal elements and Sn, the electrodes being chemically preconditioned with a reducing agent to yield $Li_{(2+2x)/(2+x)}M'_{2x/(2+x)}M_{(2-2x)/(2+x)}O_{2-\delta}$ compounds in which δ is less than 0.2, preferably less than 0.1. The metal ions, M, are selected preferably from Co, Ni, Mn or Ti ions, optionally in the presence of one or more other cations such as Mg and Al. The M' cations are selected from elements that form a $Li_2M'O_3$ rocksalt-type structure preferably from Ti, Mn, Zr, Ru and Sn and most preferably from Mn and/or Ti that form a layered rocksalt-type structure which is structurally compatible with the $LiMO_2$ component. The $xLi_2M'O_3 \cdot (1-x)LiMO_2$ electrodes have been described previously as having composite electrode structures by J-S. Kim et al in Electrochemistry Communications, volume 4, page 205 (2002). When x=0, the preconditioned electrodes are represented simply by the formula $LiMO_{2-\delta}$.

In a second embodiment of the invention, the $xLi_2M'O_3 \cdot (1-x)LiMO_2$ electrodes can be preconditioned by acid treatment optionally followed by the reduction step. When preconditioning occurs by acid treatment, ion-exchange occurs between the $H^+$ and $Li^+$ ions. In this instance, the preconditioned $xLi_2M'O_3 \cdot (1-x)LiMO_2$ electrodes can be represented prior to reduction by the general formula $xLi_{2-y}H_yO \cdot xM'O_2 \cdot (1-x)Li_{1-z}H_zMO_2$ in which 0<x<1, 0<y<1, 0<z<1, and in which the lithium ions are partially ion-exchanged by hydrogen ions. In addition, some $Li_2O$ may be removed from the structure during this process. These preconditioned electrodes can be heated, typically to temperatures above 100° C., to remove at least part of the $H_2O$ component from the structure.

Of particular significance to this invention are preconditioned $xLi_2M'O_3 \cdot (1-x)LiMO_2$ electrodes containing a $Li_2MnO_3$ component (i.e., M'=Mn). It has already been reported by M. H. Rossouw et al in the Journal of Solid State Chemistry, volume 104, page 464 (1993) that lithium and oxygen can be removed from $Li_2MnO_3$ by acid treatment to create a composite $xLi_2MnO_3 \cdot (1-x)MnO_2$ structure without destroying the layered arrangement of the Mn ions; on relithiation, either chemically with LiI or electrochemically in an electrochemical cell, lithium can be inserted into the $MnO_2$ component of the composite structure to yield $xLi_2MnO_3 \cdot (1-x)LiMnO_2$. These composite electrode structures may contain protons ($H^+$ ions) as a result of the $H^+$—$Li^+$ ion exchange reactions that occur, for example, during the preconditioning acid-treatment step or when immersed in the non-aqueous electrochemical cells that contain acidic electrolytes such as those containing $LiPF_6$ salts. For simplicity, these protons are not always included in the description of the preconditioned electrode structures of this invention. The composition of $xLi_2MnO_3 \cdot (1-x)LiMO_2$ electrodes can be modified by selection of one or more appropriate metal (M) cations, preferably from one or more of Co, Ni, Mn or Ti, ions, optionally in the presence of one or more other metal cations, selected preferably from the first row of transition metal elements, or from lighter metal elements in the periodic table, such as Mg and Al. Examples of such two-component systems are $xLi_2MnO_3 \cdot (1-x)LiCoO_2$ as reported by K. Numata et al in Solid State Ionics, volume 118, page 117 (1999), and $xLi_2MnO_3 \cdot (1-x)LiCrO_2$ as reported by B. Ammundsen et al in the Journal of the Electrochemical Society, volume 149, page A431 (2002). Composite electrodes that are showing particular promise typically contain two or more electrochemically-active M cations, for example, $Li[Ni_xLi_{(1/3-2x/3)}Mn_{(2/3-x/3)}]O_2$ ($0<x<\frac{1}{2}$) as reported by Z. Lu et al in Chemistry of Materials, volume 15, page 3214 (2003), which can be reformulated in composite notation as $(1-2x)Li_2MnO_3 \cdot (3x)LiMn_{0.5}Ni_{0.5}O_2$ for the same range of x, and electrodes in which M=Co, Mn and Ni, represented generically as $xLi_2MnO_3 \cdot (1-x)LiCo_{1-a}Ni_bMn_cO_2$ in which a=b+c.

A major advantage of using two-component $xLi_2M'O_3 \cdot (1-x)LiMO_2$ composite (positive) electrodes, as defined herein, is that the $Li_2M'O_3$ component, particularly when present as $Li_2MnO_3$, can be used effectively to supply an excess of lithium to the positive electrode to offset irreversible capacity loss effects associated with the negative electrode of lithium-ion cells, such as lithiated graphite, $Li_xC_6$ ($0<x<1$). For example, it has been established that when $xLi_2MnO_3 \cdot (1-x)LiNi_{0.5}Mn_{0.5}O_2$ electrodes are charged in lithium cells, the electrochemical reaction occurs first by lithium extraction from the $LiNi_{0.5}Mn_{0.5}O_2$ component between 3.0 and 4.2 V, and thereafter by a concomitant extraction of lithium from the $Li_2MnO_3$ component. It is believed that the latter process (typically at potentials between 4.2 and 4.6 V) is also accompanied by the chemical loss of oxygen from the surface of the delithiated $xLi_2MnO_3 \cdot (1-x)LiNi_{0.5}Mn_{0.5}O_2$ electrode particles, either as oxygen gas or by reaction with the organic solvents of the electrolyte, for example, organic carbonates such as ethylene carbonate, dimethyl carbonate, diethyl carbonate and the like. In such situations, the result is not only a chemical reduction of the electrode surface by loss of oxygen, but also the loss of some $Li_2O$ from the $Li_2MnO_3$ ($Li_2O \cdot MnO_2$) component that leaves behind an electrochemically active $MnO_2$ species, thereby increasing the operating capacity of the electrode. Despite the fact that $xLi_2M'O_3 \cdot (1-x)LiMO_2$ composite electrodes exhibit an irreversible capacity loss during the initial cycle, these electrodes provide significantly higher electrode capacities on subsequent cycling than conventional layered $LiCoO_2$ or $LiNiO_2$ electrodes and $LiMn_2O_4$ spinel electrodes. It would be advantageous to precondition layered $LiMO_2$ or composite $xLi_2M'O_3 \cdot (1-x)LiMO_2$ electrodes chemically prior to assembling them in cells by removing oxygen and/or $Li_2O$ from the surface of the electrodes to minimize irreversible capacity loss effects and to increase the operating capacity of the electrodes, particularly during the early cycling of cells.

According to a third embodiment, the preconditioned electrodes of the invention can be synthesized by subjecting the parent $LiMO_2$ or composite $xLi_2M'O_3 \cdot (1-x)LiMO_2$ electrodes, for example, either in powder or laminate form, to a suitable reducing agent such as ammonia gas, dilute hydrogen gas, for example, 2-6 percent by volume of hydrogen in argon gas, carbon monoxide gas, or carbon at moderately high temperatures, such as 150-600° C., to reduce the surface of the $LiMO_2$ or composite $xLi_2M'O_3 \cdot (1-x)LiMO_2$ electrodes. Gaseous reducing agents, such as ammonia, are preferred to solid reducing agents such as finely-divided carbon powder because it is easier to control the extent to which the surface of the $LiMO_2$ electrode is reduced. Alternatively, the $LiMO_2$ or composite $xLi_2M'O_3 \cdot (1-x)LiMO_2$ electrodes can be reduced by heating the electrodes under nitrogen gas or air at elevated temperature, typically at 600° C. or higher, for example, between 900° C. and 1000° C. simultaneously to remove both oxygen and $Li_2O$ from the surface of the electrode structure.

In a further embodiment of the invention, the $LiMO_2$ or $xLi_2M'O_3 \cdot (1-x)LiMO_2$ composite electrodes of the invention can alternatively be subjected, prior to the reduction process described above, to a preconditioning step in a proton-containing medium, for example, de-ionized water or an acidic solution of an inorganic acid or an organic acid with a pH<7.0 such as phosphoric acid, sulfuric acid, nitric acid, acetic acid, hydrochloric acid or the like, for example, hydrofluoric acid, to exchange some of the Li+ ions within the electrode structure with $H^+$ ions, and thereafter to a heating step, preferably for less than 24 hours below 500° C., more preferably below 400° C.

In yet a further embodiment, the $LiMO_2$ or $xLi_2M'O_3 \cdot (1-x)LiMO_2$ composite electrodes may be preconditioned by subjecting the electrodes only to the proton-containing medium, i.e., without a reduction step. For example, it is already known that acid treatment of $Li_2MnO_3$ yields a proton-exchanged $Li_{2-y}H_yMnO_3$ compound that can be reformulated, in component notation, as $(1-y/2)Li_2O \cdot y/2H_2O \cdot MnO_2$. In this respect, it stands to reason that if the pH is less than 7, proton exchange will occur in the $LiMO_2$ or $xLi_2M'O_3 \cdot (1-x)LiMO_2$ composite electrodes of the invention, irrespective of the choice of the proton-containing solution of an inorganic acid or organic acid, such as phosphoric acid, sulfuric acid, nitric acid, acetic acid, hydrochloric acid and hydrofluoric acid. It is believed that such an ion-exchange process followed by a heat-treatment step may be used effectively to precondition the electrode because it should be easier to remove (or partially remove), by heating, a $H_2O$ component from the structure rather than a $Li_2O$ component, in order to increase the $MnO_2$ component in the initial electrode and therefore its inherent electrochemical capacity. In a final embodiment, this invention extends to include electrochemical lithium cells and batteries that employ the preconditioned $LiMO_2$ or composite $xLi_2M'O_3 \cdot (1-x)MO_2$ electrodes as fully described herein.

The following examples describe the principles of the invention and possible methods of synthesizing the pre-reduced electrodes of this invention as contemplated by the inventors, but they are not to be construed as limiting examples.

Example 1

Figure 1:
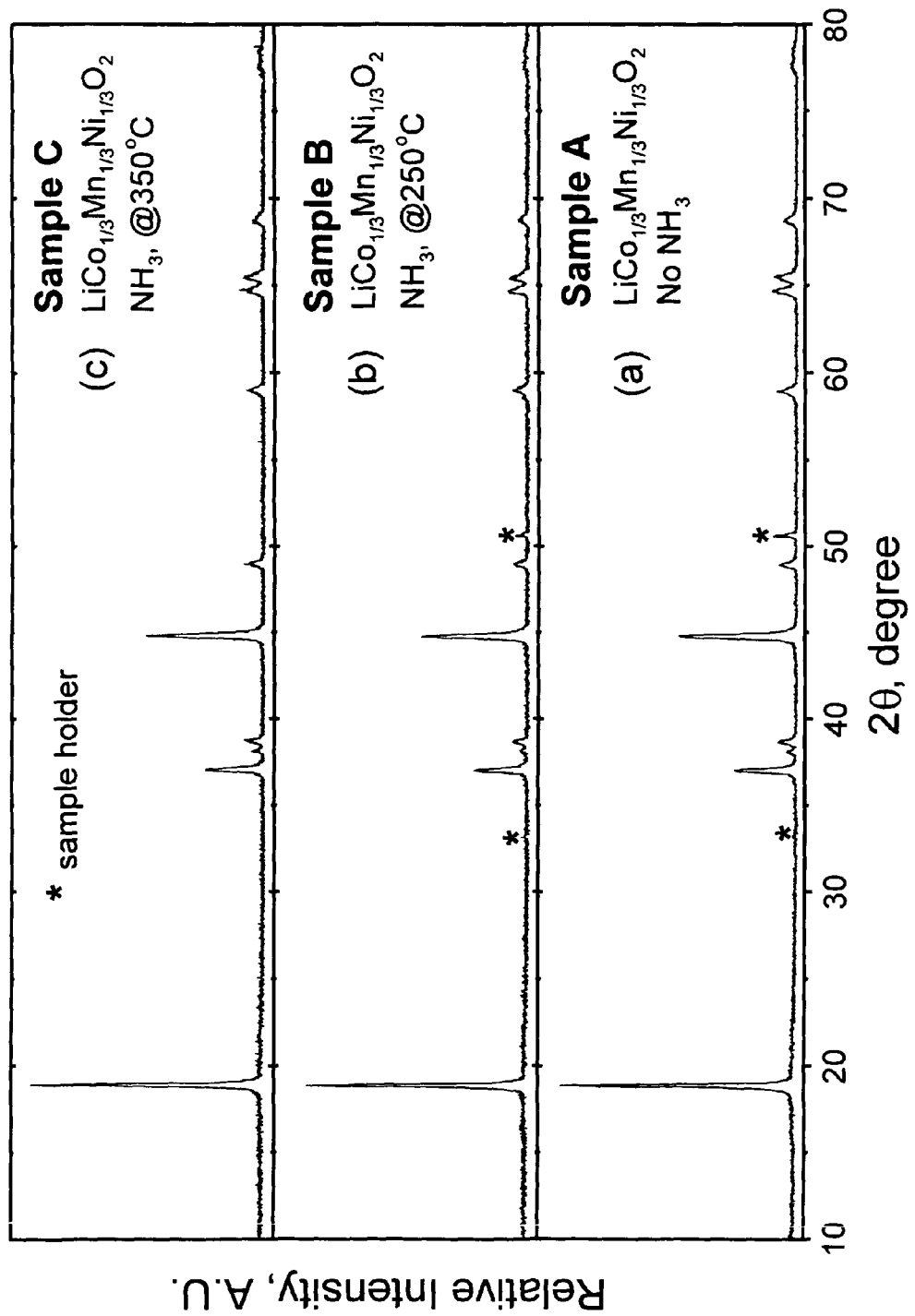
FIG. 1 illustrates the powder X-ray diffraction patterns of a) an untreated $LiMn_{0.33}Ni_{0.33}Co_{0.33}O_2$ electrode; b) a $LiMn_{0.33}Ni_{0.33}Co_{0.33}O_2$ electrode treated with $NH_3$ at 250° C.; and c) a $LiMn_{0.33}Ni_{0.33}Co_{0.33}O_2$ electrode treated with $NH_3$ at 350° C.

Synthesis of $LiMn_{0.33}Ni_{0.33}Co_{0.33}O_2$ Electrodes $LiMn_{0.33}Ni_{0.33}Co_{0.33}O_2$ powder was synthesized from $LiOH \cdot H_2O$ and $Mn_{0.33}Ni_{0.33}Co_{0.33}(OH)_x$ (x~2) precursors. $LiOH \cdot H_2O$ was used as supplied by Aldrich (98% pure). The $Mn_{0.33}Ni_{0.33}Co_{0.33}(OH)_x$ precursor was prepared by coprecipitation of the required stiochiometric amounts of metal nitrates $M(NO_3)_2 \cdot xH_2O$ (M=Mn, Ni, and Co). After intimate mixing and grinding, the powdered mixture was pressed into a pellet and placed in a muffle furnace. A two-step heating procedure was used to fire the pellet according to the following procedure. First, a low temperature calcination step was performed at 480° C. for 5 hr. The pellet was then ground again and recompacted into pellet form. Second, a high temperature sintering step was performed at 900° C. for 3 hr followed by rapid quenching of the pellet between two copper plates. The pellet was ground a final time. Samples of the resulting $LiMn_{0.33}Ni_{0.33}Co_{0.33}O_2$ powder were heated at either 250 or 350° C. for approximately 20 hr in a tubular furnace under flowing $NH_3$ gas. The X-ray diffraction patterns of the parent $LiMn_{0.33}Ni_{0.33}Co_{0.33}O_2$ compound and the $NH_3$-treated $LiMn_{0.33}Ni_{0.33}Co_{0.33}O_2$ samples are shown in FIG. 1(a-c), respectively; there were no significant differences in the X-ray patterns of the untreated- and $NH_3$-treated $LiMn_{0.33}Ni_{0.33}Co_{0.33}O_2$ sample, indicating that there were no substantial changes to the bulk of the electrode structure.

Example 2

Electrochemical Evaluation of $LiMn_{0.33}Ni_{0.33}Co_{0.33}O_2$ Electrodes

Electrochemical evaluation of $LiMn_{0.33}Ni_{0.33}Co_{0.33}O_2$ and preconditioned $LiMn_{0.33}Ni_{0.33}Co_{0.33}O_2$ positive electrodes was carried out as follows. The electrodes for the lithium cell were fabricated from an intimate mixture of 84 wt % of $LiMn_{0.33}Ni_{0.33}Co_{0.33}O_2$ electrode powder, 8 wt % polyvinylidene difluoride (PVDF) polymer binder (Kynar, Elf-Atochem), 4 wt % acetylene black (Cabot), and 4 wt % graphite (SFG-6, Timcal) slurried in 1-methyl-2-pyrrolidinone (NMP) (Aldrich, 99+%). An electrode laminate was cast from the slurry onto an Al current collector foil using a doctor-blade. The laminate was subsequently dried, first at 75° C. for 10 h, and thereafter under vacuum at 70° C. for 12 h. The electrolyte was 1 M $LiPF_6$ in ethylene carbonate (EC):diethyl carbonate (DEC) (1:1 mixture). The electrodes were evaluated at both room temperature and 50° C. in coin-type cells (size CR2032, Hohsen) with a lithium foil counter electrode (FMC Corporation, Lithium Division) and a polypropylene separator (Celgard 2400). Cells were assembled inside a He glovebox (<5 ppm, $H_2O$ and $O_2$) and cycled on a Maccor Series 2000 tester under galvanostatic mode with a constant current density of either 0.3 $mA/cm^2$ or 0.1 $mA/cm^2$.

Figure 2:
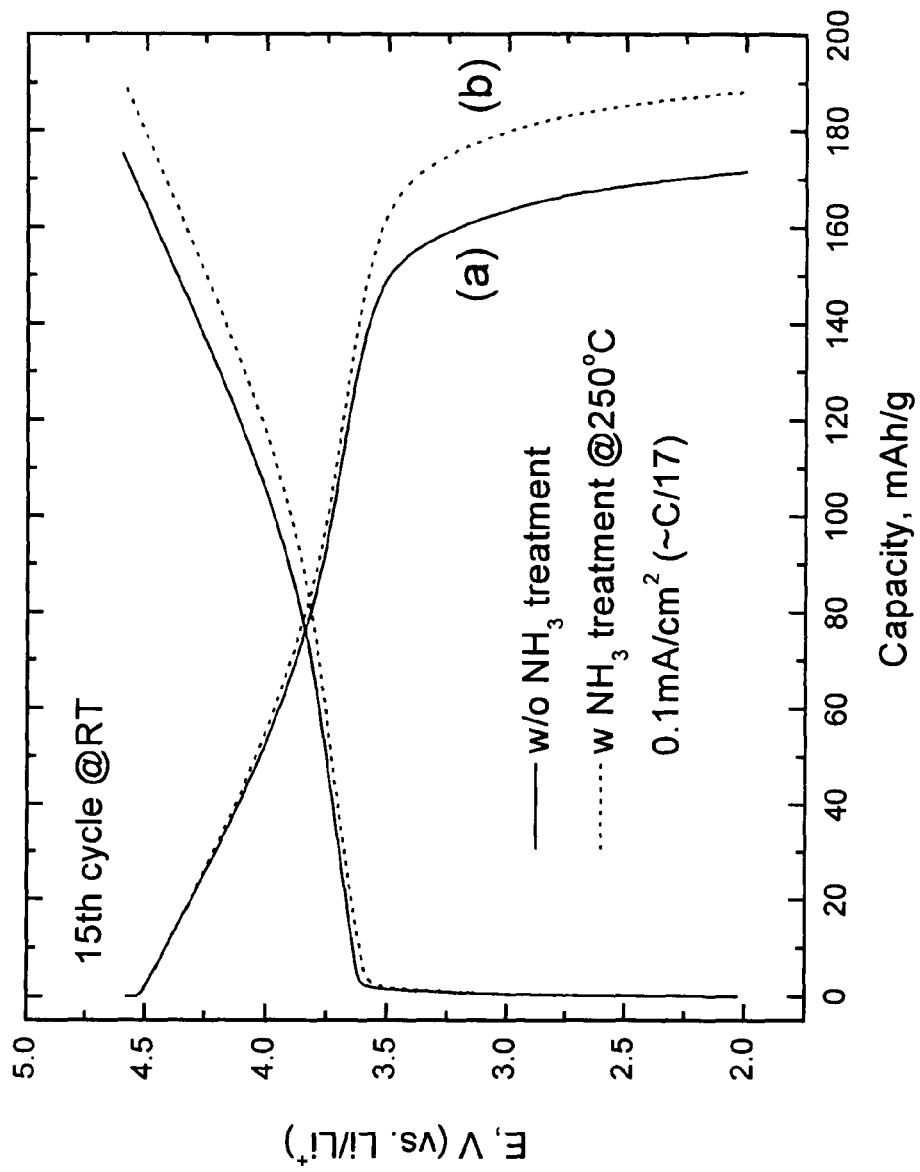
FIG. 2 illustrates the electrochemical voltage profiles, at the 15$^{th}$ cycle, of lithium cells, operated at room temperature (RT) between 4.6 and 2.0 V, with a) an untreated $LiMn_{0.33}Ni_{0.33}Co_{0.33}O_2$ electrode; and b) a $NH_3$-treated $LiMn_{0.33}Ni_{0.33}Co_{0.33}O_2$ electrode.

The electrochemical voltage profiles, at the $15^{th}$ cycle, of lithium cells, operated at room temperature between 4.6 and 2.0 V, with an untreated $LiMn_{0.33}Ni_{0.33}Co_{0.33}O_2$ electrode and a $NH_3$-treated (250° C.) $LiMn_{0.33}Ni_{0.33}Co_{0.33}O_2$ electrode are shown in FIG. 2 (a and b), respectively. It is clearly apparent that the capacity delivered by the electrochemical cell containing the $NH_3$-treated $LiMn_{0.33}Ni_{0.33}Co_{0.33}O_2$ electrode is significantly superior to that of the cell with the untreated $LiMn_{0.33}Ni_{0.33}Co_{0.33}O_2$ electrode in accordance with the principles of the invention.

Figure 3:
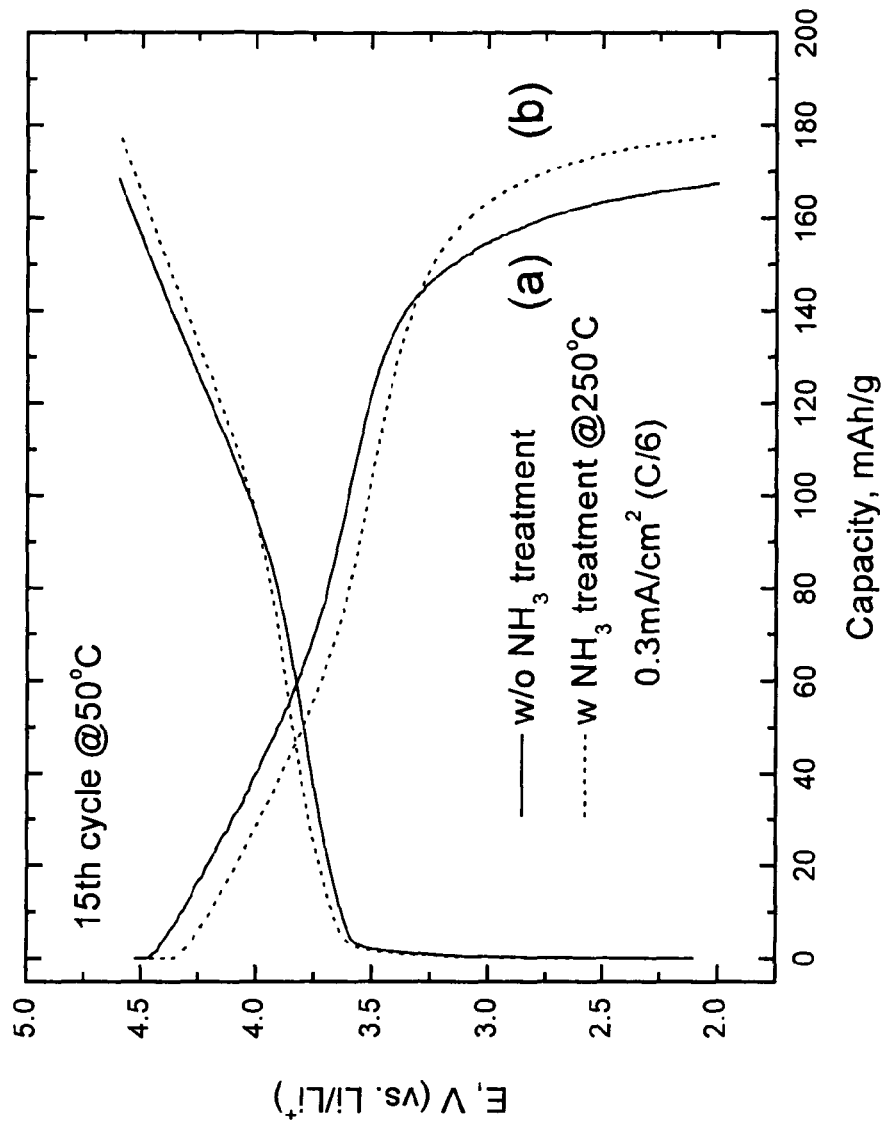
FIG. 3 illustrates the electrochemical voltage profiles, at the 15$^{th}$ cycle, of lithium cells operated at 50° C. between 4.6 and 2.0 V, with a) an untreated $LiMn_{0.33}Ni_{0.33}Co_{0.33}O_2$ electrode; and b) a $NH_3$-treated $LiMn_{0.33}Ni_{0.33}Co_{0.33}O_2$ electrode.
Figure 4:
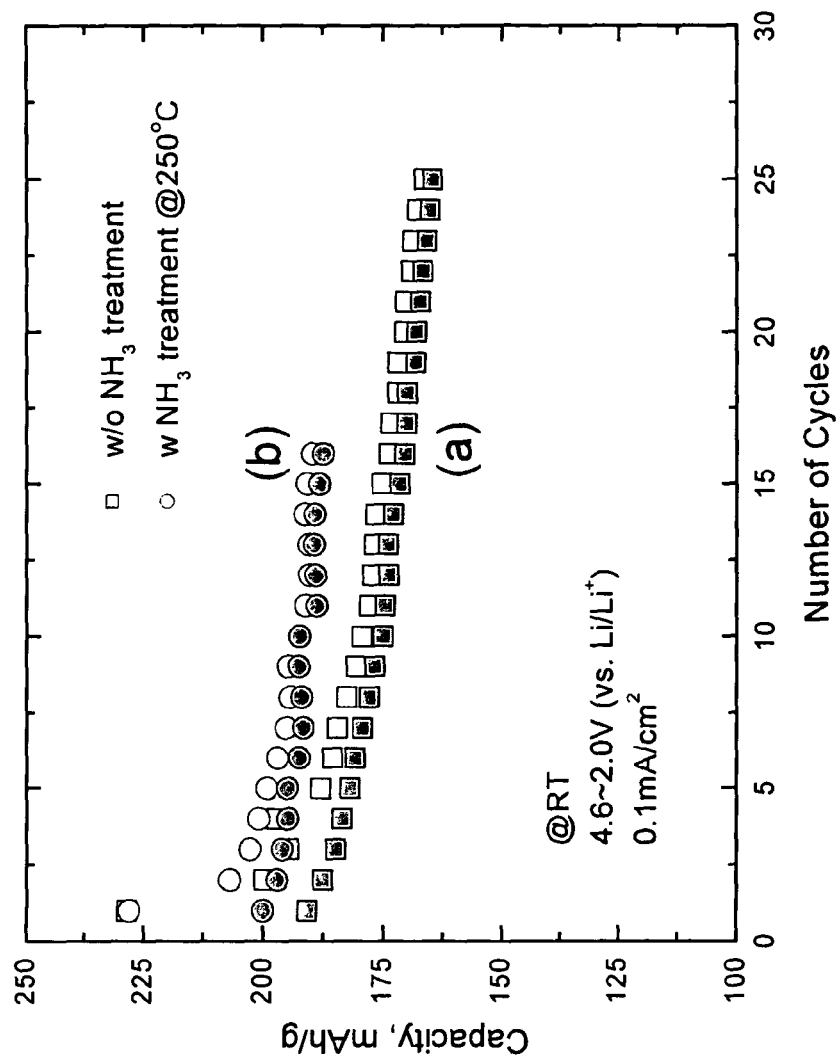
FIG. 4 illustrates plots of electrode capacity vs. cycle number of lithium cells, operated at room temperature (RT) between 4.45 and 2.5 V, with a) an untreated $LiMn_{0.33}Ni_{0.33}Co_{0.33}O_2$ electrode; and b) a $NH_3$-treated $LiMn_{0.33}Ni_{0.33}Co_{0.33}O_2$ electrode.
Figure 5:
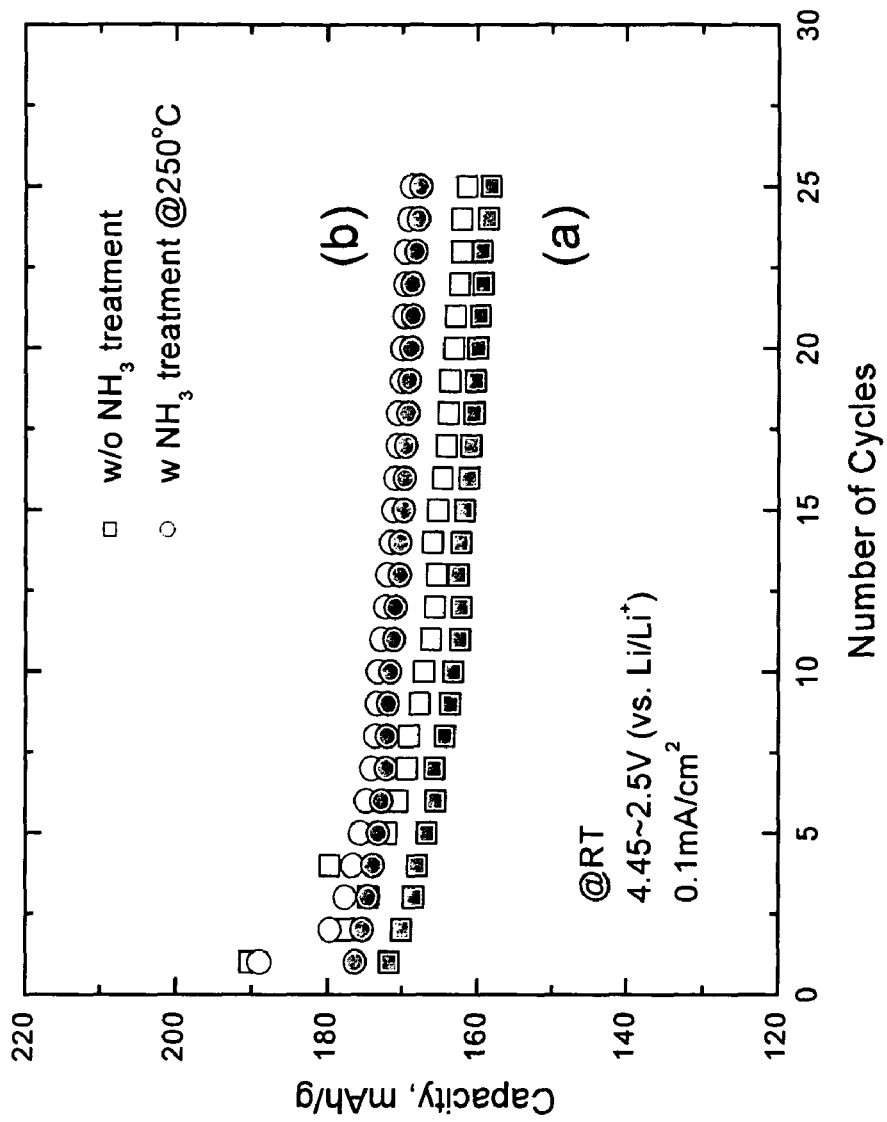
FIG. 5 illustrates plots of electrode capacity vs. cycle number of lithium cells, operated at room temperature (RT) between 4.6 and 2.0 V, with a) an untreated $LiMn_{0.33}Ni_{0.33}Co_{0.33}O_2$ electrode; and b) a $NH_3$-treated $LiMn_{0.33}Ni_{0.33}Co_{0.33}O_2$ electrode.
Figure 6:
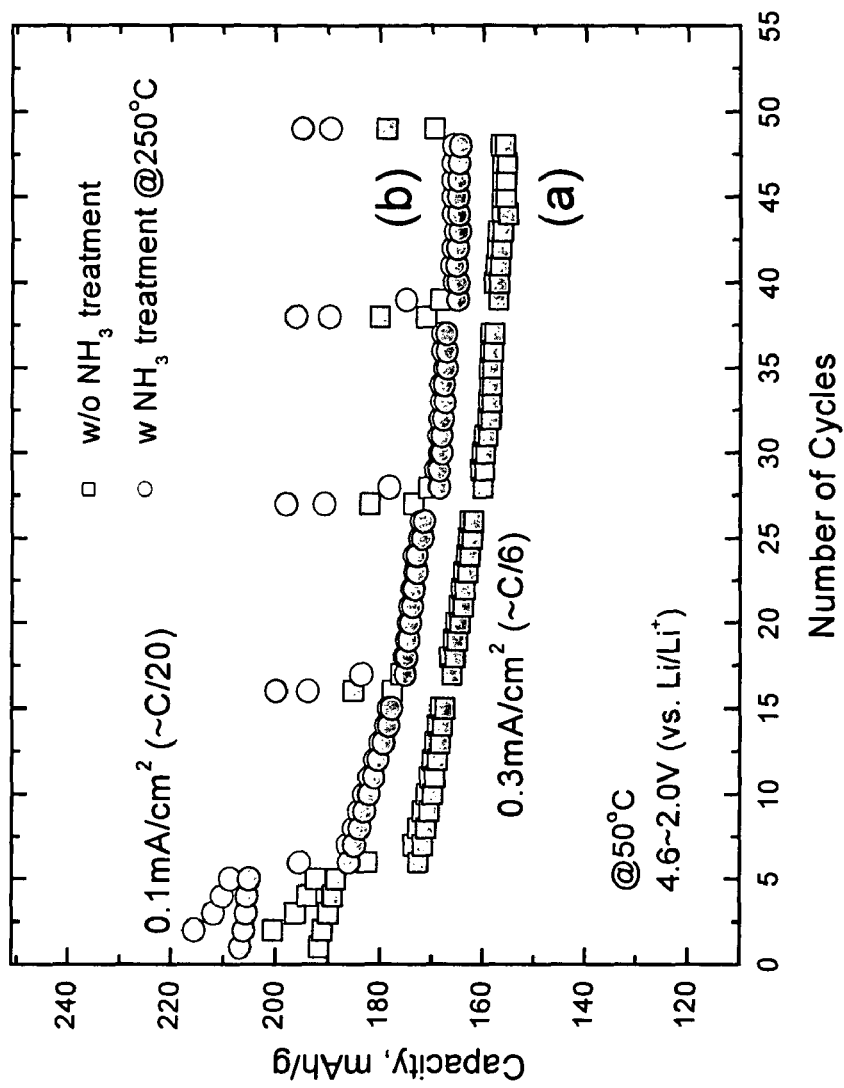
FIG. 6 illustrates plots of electrode capacity vs. cycle number of lithium cells, operated at 50° C. between 4.6 and 2.0 V, with a) an untreated $LiMn_{0.33}Ni_{0.33}Co_{0.33}O_2$ electrode; and b) a $NH_3$-treated $LiMn_{0.33}Ni_{0.33}Co_{0.33}O_2$ electrode.

The electrochemical voltage profiles, at the $15^{th}$ cycle, of lithium cells, operated at 50° C. between 4.6 and 2.0 V, with an untreated $LiMn_{0.33}Ni_{0.33}Co_{0.33}O_2$ electrode and a $NH_3$-treated $LiMn_{0.33}Ni_{0.33}Co_{0.33}O_2$ electrode are shown in FIG. 3 (a and b), respectively. It is clearly apparent that the capacity delivered by the electrochemical cell containing the $NH_3$-treated (250° C.) $LiMn_{0.33}Ni_{0.33}Co_{0.33}O_2$ electrode is significantly superior to that of the cell with the untreated $LiMn_{0.33}Ni_{0.33}Co_{0.33}O_2$ electrode in accordance with the principles of the invention. FIG. 4 (a and b) represents plots of electrode capacity vs. cycle number of lithium cells operated at room temperature between 4.6 and 2.0 V, with an untreated $LiMn_{0.33}Ni_{0.33}CO_{0.33}O_2$ electrode and a $NH_3$-treated $LiMn_{0.33}Ni_{0.33}Co_{0.33}O_2$ electrode, respectively, whereas FIG. 5 (a and b) represents plots of electrode capacity vs. cycle number of lithium cells operated at room temperature between 4.45 and 2.5 V, with an untreated $LiMn_{0.33}Ni_{0.33}Co_{0.33}O_2$ electrode and a $NH_3$-treated $LiMn_{0.33}Ni_{0.33}Co_{0.33}O_2$ electrode, respectively. FIG. 6 (a and b) represents plots of electrode capacity vs. cycle number of lithium cells operated at 50° C., between 4.6 and 2.0 V, with an untreated $LiMn_{0.33}Ni_{0.33}Co_{0.33}O_2$ electrode and a $NH_3$-treated $LiMn_{0.33}Ni_{0.33}Co_{0.33}O_2$ electrode, respectively. These data clearly illustrate the superior capacity delivered consistently by the $NH_3$-treated $LiMn_{0.33}Ni_{0.33}Co_{0.33}O_2$ electrodes compared to the untreated $LiMn_{0.33}Ni_{0.33}Co_{0.33}O_2$ electrodes in accordance with the principles of this invention. Of particular note is that the coulombic efficiency of the cells containing the $NH_3$-treated $LiMn_{0.33}Ni_{0.33}Co_{0.33}O_2$ electrode is notably superior to that of the cell containing the untreated $LiMn_{0.33}Ni_{0.33}Co_{0.33}O_2$ electrode (FIGS. 4 and 5). The $NH_3$ preconditioning step also increases the first-cycle reversible capacity of the $LiMn_{0.33}Ni_{0.33}Co_{0.33}O_2$ electrodes from 83% (unconditioned electrode, Sample A) to 88% (preconditioned electrodes, Samples B and C) as shown in Table 1.

TABLE 1

Charge/discharge capacities and reversible capacity (%) of the initial cycle of lithium cells with unconditioned- and preconditioned $LiMn_{0.33}Ni_{0.33}Co_{0.33}O_2$ electrodes.

| Electrode | Initial Charge Capacity (mAh/g) | Initial Discharge Capacity (mAh/g) | Reversible Capacity (%) |
|---|---|---|---|
| Sample A | 229 | 191 | 83 |
| Sample B | 228 | 200 | 88 |
| Sample C | 229 | 201 | 88 |

Figure 7A:
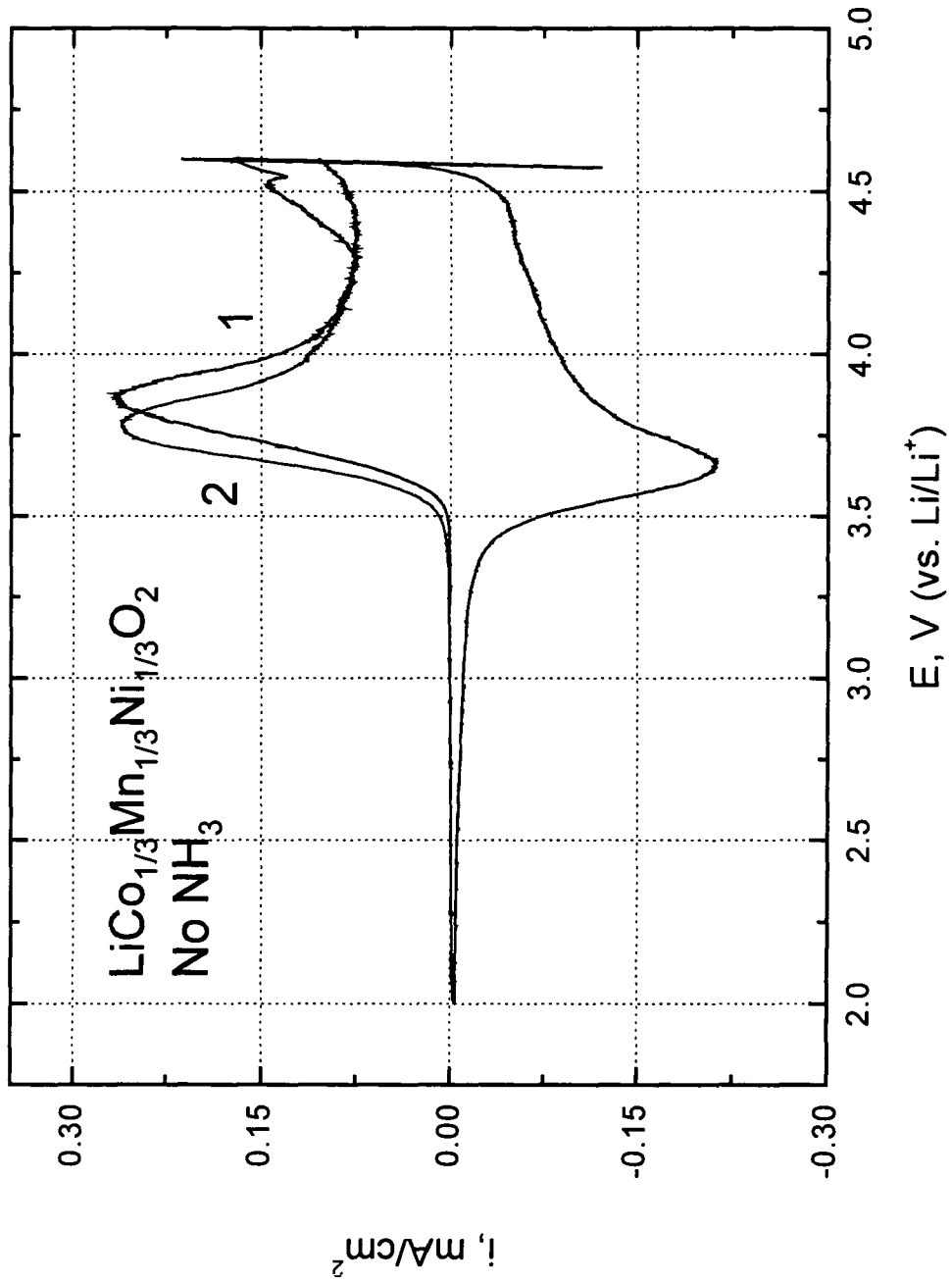
FIG. 7a illustrates cyclic voltammograms between 4.6 and 2.0 V vs. metallic lithium of an untreated $LiMn_{0.33}Ni_{0.33}Co_{0.33}O_2$ electrode.
Figure 7B:
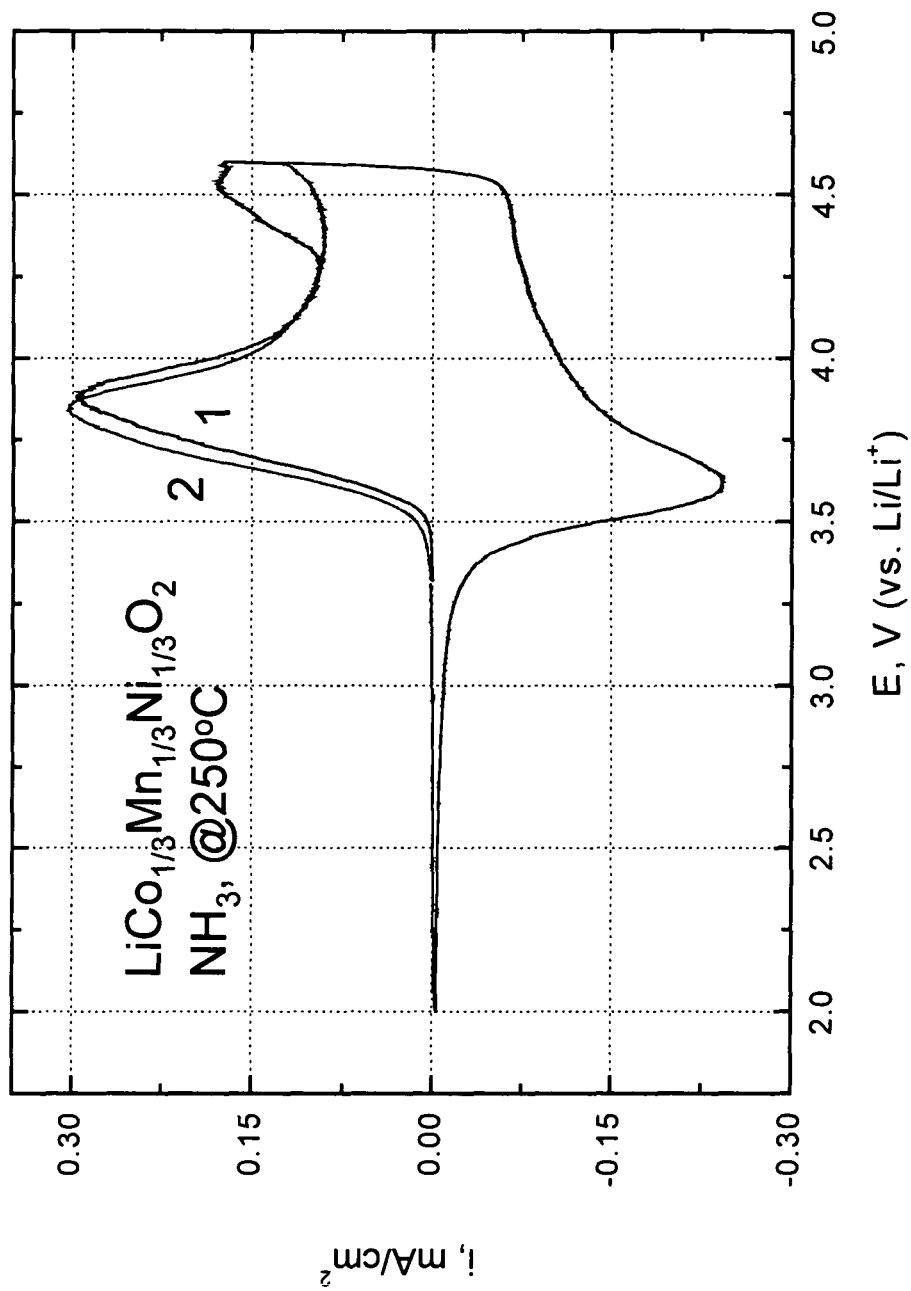
FIG. 7b illustrates cyclic voltammograms between 4.6 and 2.0 V vs. metallic lithium of a $LiMn_{0.33}Ni_{0.33}Co_{0.33}O_2$ electrode treated with $NH_3$ at 250° C.
Figure 7C:
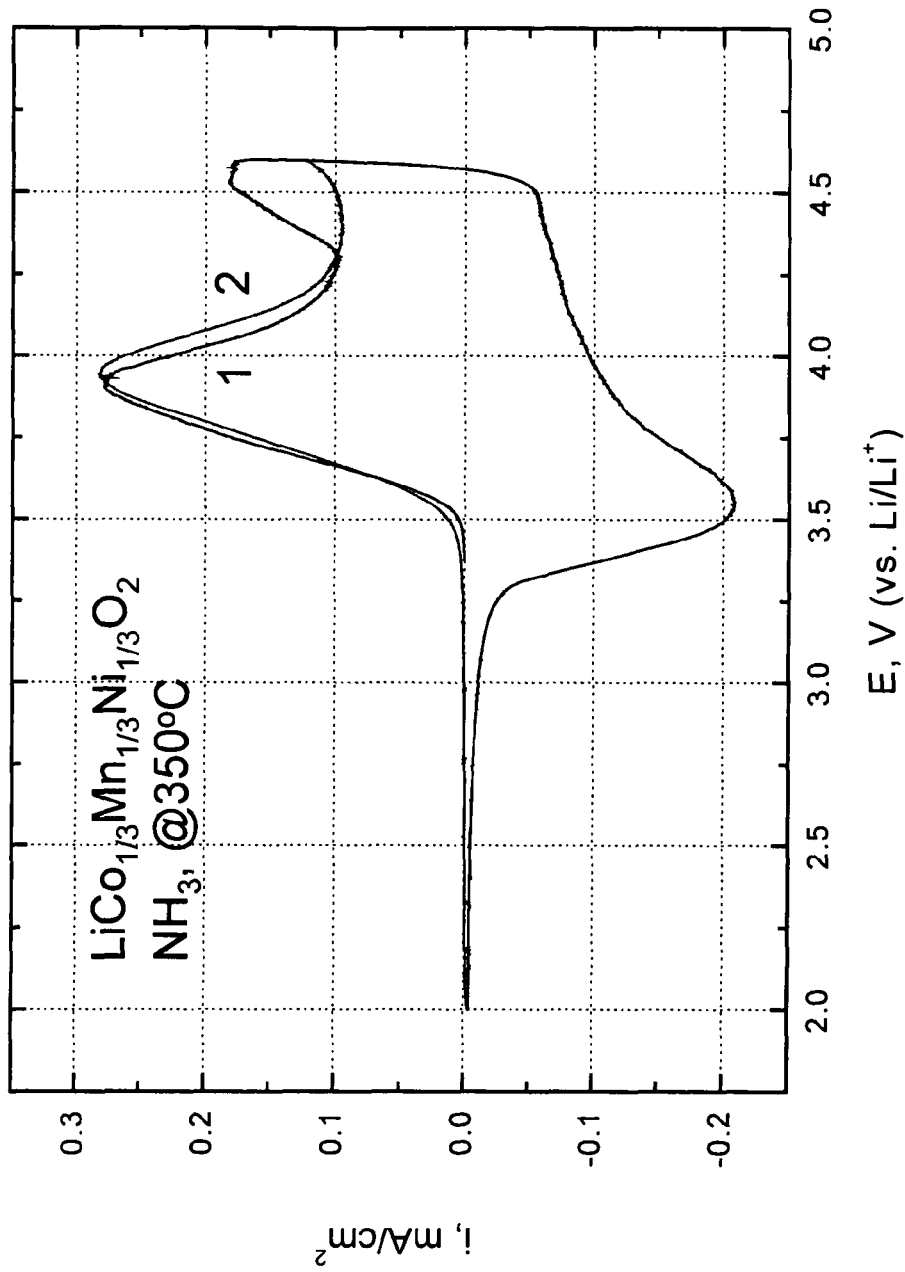
FIG. 7c illustrates cyclic voltammograms between 4.6 and 2.0 V vs. metallic lithium of a $LiMn_{0.33}Ni_{0.33}Co_{0.33}O_2$ electrode treated with $NH_3$ at 350° C.

FIGS. 7a, 7b and 7c (samples A-C, respectively) represent plots of cyclic voltammograms between 4.6 and 2.0 V vs. metallic lithium of an untreated $LiMn_{0.33}Ni_{0.33}Co_{0.33}O_2$ electrode, a $LiMn_{0.33}Ni_{0.33}Co_{0.33}O_2$ electrode treated with $NH_3$ at 250° C., and a $LiMn_{0.33}Ni_{0.33}Co_{0.33}O_2$ electrode treated with $NH_3$ at 350° C., respectively. It is significant that the second oxidative sweep of the untreated $LiMn_{0.33}Ni_{0.33}Co_{0.33}O_2$ electrode between 3.5 and 4.25 V (FIG. 7a) occurs at a lower potential than the initial sweep, indicating that the surface of the electrode had been reduced electrochemically during the first cycle. By contrast, the difference in potential between the first and second oxidative sweep of an $LiMn_{0.33}Ni_{0.33}Co_{0.33}O_2$ electrode treated with $NH_3$ at 250° C. (FIG. 7b) and at 350° C. (FIG. 7c) is less than it is for the untreated $LiMn_{0.33}Ni_{0.33}Co_{0.33}O_2$ electrode (FIG. 7a), consistent with the principles of the invention that $NH_3$ treatment reduces the electrode surface to provide enhanced electrode stability as demonstrated by the improved coulombic efficiency of the $NH_3$-treated electrodes (FIGS. 4 and 5). These data illustrate that preconditioning the electrode produces improved cycling characteristics. Although it is difficult to determine the precise degree to which the parent electrode is reduced by the chemical preconditioning process, particularly at the surface, excessive reduction will damage the electrode structure and degrade the electrochemical properties of the electrode. It is therefore, believed that optimum electrochemical performance will only be achieved for mild levels of reduction, i.e., for δ less than 0.2, preferably less than 0.1 in the $Li_{(2+2x)/(2+x)}M'_{2x/(2+x)}M_{(2-2x)/(2+x)}O_{2-\delta}$ electrodes of this invention.

Example 3

Synthesis of $0.3Li_2MnO_3 \cdot 0.7LiMn_{0.5}Ni_{0.5}O_2$ Composite Electrodes

Figure 8:
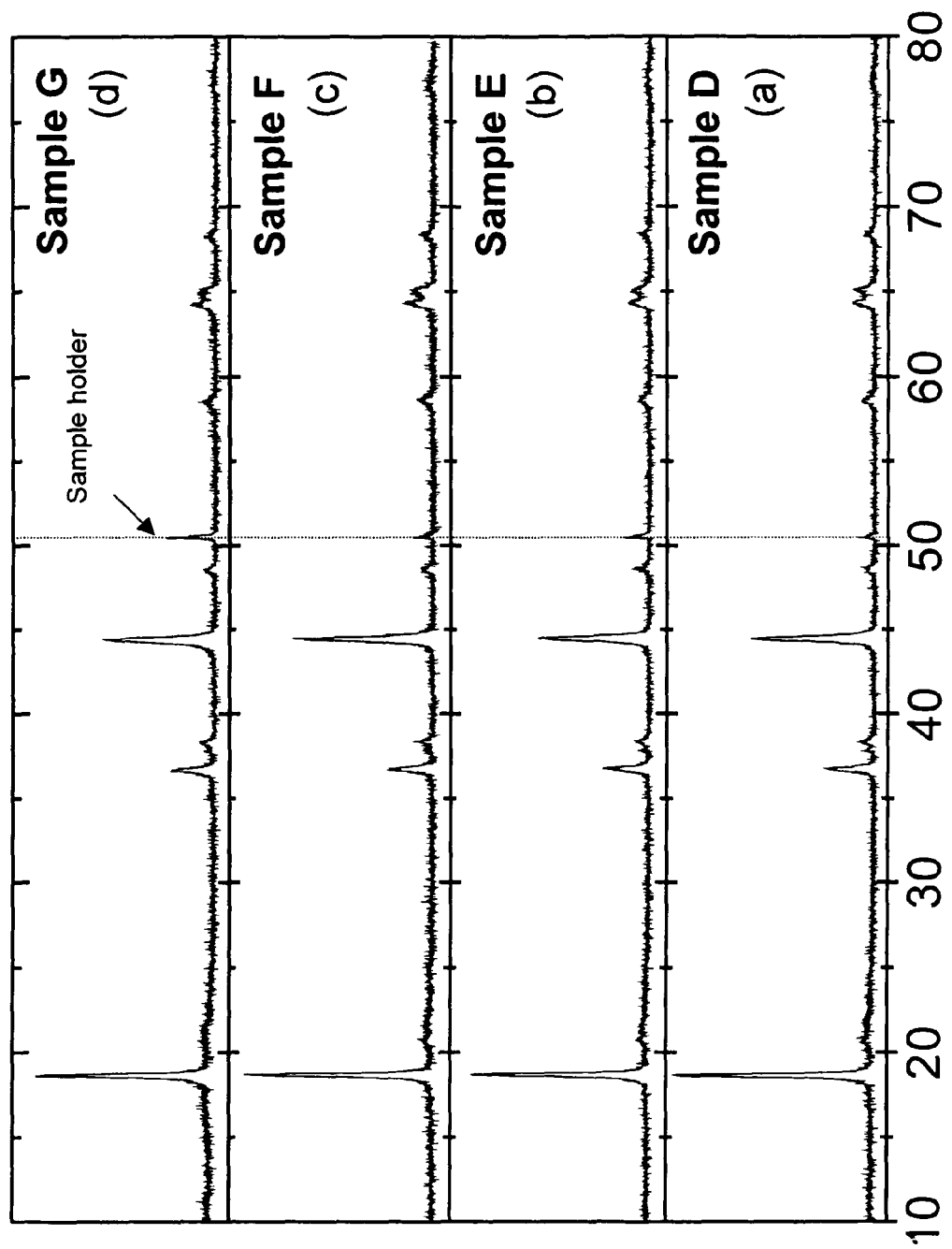
FIG. 8 illustrates the powder X-ray diffraction pattern of a) a $0.3Li_2MnO_3 \cdot 0.7LiMn_{0.5}Ni_{0.5}O_2$ composite electrode; b) a $0.3Li_2MnO_3 \cdot 0.7LiMn_{0.5}Ni_{0.5}O_2$ composite electrode treated with $NH_3$ at 200° C.; c) a $0.3Li_2MnO_3 \cdot 0.7LiMn_{0.5}Ni_{0.5}O_2$ composite electrode treated first with $H_2O$ at room temperature and then with $NH_3$ at 200° C.; and d) a $0.3Li_2MnO_3 \cdot 0.7LiMn_{0.5}Ni_{0.5}O_2$ composite electrode treated first with $HNO_3$ at room temperature and then with $NH_3$ at 200° C.

An electrode material with the composite formula $0.3Li_2MnO_3 \cdot 0.7LiMn_{0.5}Ni_{0.5}O_2$ was prepared directly from $Ni_{1-x}Mn_x(OH)_2$ and $LiOH \cdot H_2O$ precursors using the required Li:Mn:Ni ratio. The $Ni_{1-x}Mn_x(OH)_2$ precursor was prepared by precipitation from a basic LiOH solution of $Ni(NO_3)_2$ and $Mn(NO_3)_2$ (pH~11). The reagents were intimately mixed in an acetone slurry, dried in an oven overnight, and subsequently fired at 480° C. for 12 h and then at 900° C. for 5 h in air. Thereafter, the $0.3Li_2MnO_3 \cdot 0.7LiMn_{0.5}Ni_{0.5}O_2$ product was rapidly quenched (also in air). The X-ray diffraction pattern of the resulting powder is shown in FIG. 8a (Sample D). The electrode powder was preconditioned according to the following procedures prior to cell assembly: 1) subjecting the powder to flowing $NH_3$ gas in a tubular furnace at 200° C. for approximately 20 hrs, the X-ray diffraction pattern of this product being shown in FIG. 8b (Sample E); 2) washing the powder in de-ionized water (p~6.5) before subjecting the powder to flowing $NH_3$ gas in a tubular furnace at 200° C. for approximately 20 hrs, the X-ray diffraction pattern of this product being shown in FIG. 8c (Sample F); 3) treating the powder with 0.1 M $HNO_3$ (pH~1.8) before subjecting the powder to flowing $NH_3$ gas in a tubular furnace at 200° C. for approximately 20 hrs, the X-ray diffraction pattern of this product being shown in FIG. 8d (Sample G). There were no significant differences in the X-ray patterns of Samples D, E, F and G, indicating that there were no significant changes to the bulk structure of the individual compounds. Refinement of the lattice parameters of Samples D, E and G using rhombohedral symmetry (hexagonal setting), which is typical of layered-type compounds such as $LiCoO_2$ (Table 2), showed that there was an insignificant change of the lattice parameters after $NH_3$-treatment (Sample D). However, the slight expansion of the c-axis in Sample G is consistent with the removal of some lithium from the composite structure as a result of acid-treatment.

TABLE 2

Lattice parameters of Samples D, E, and G.

| Electrode | a (Å) | c (Å) |
|---|---|---|
| Sample D (untreated) | 2.8655(3) | 14.254(3) |
| Sample E ($NH_3$-treated) | 2.8666(3) | 14.259(3) |
| Sample G ($HNO_3/NH_3$-treated) | 2.8711(3) | 14.271(4) |

Example 4

Electrochemical Evaluation of $0.3Li_2MnO_3 \cdot 0.7LiMn_{0.5}Ni_{0.5}O_2$ Composite Electrodes The construction of lithium cells containing $0.3Li_2MnO_3 \cdot 0.7LiMn_{0.5}Ni_{0.5}O_2$ and preconditioned $0.3Li_2MnO_3 \cdot 0.7LiMn_{0.5}Ni_{0.5}O_2$ positive electrodes was carried out by the same procedure as described in Example 2. Cells were cycled under galvanostatic mode between 4.6 and 2.0 V at constant current density (0.1 mA/cm²).

Figure 9:
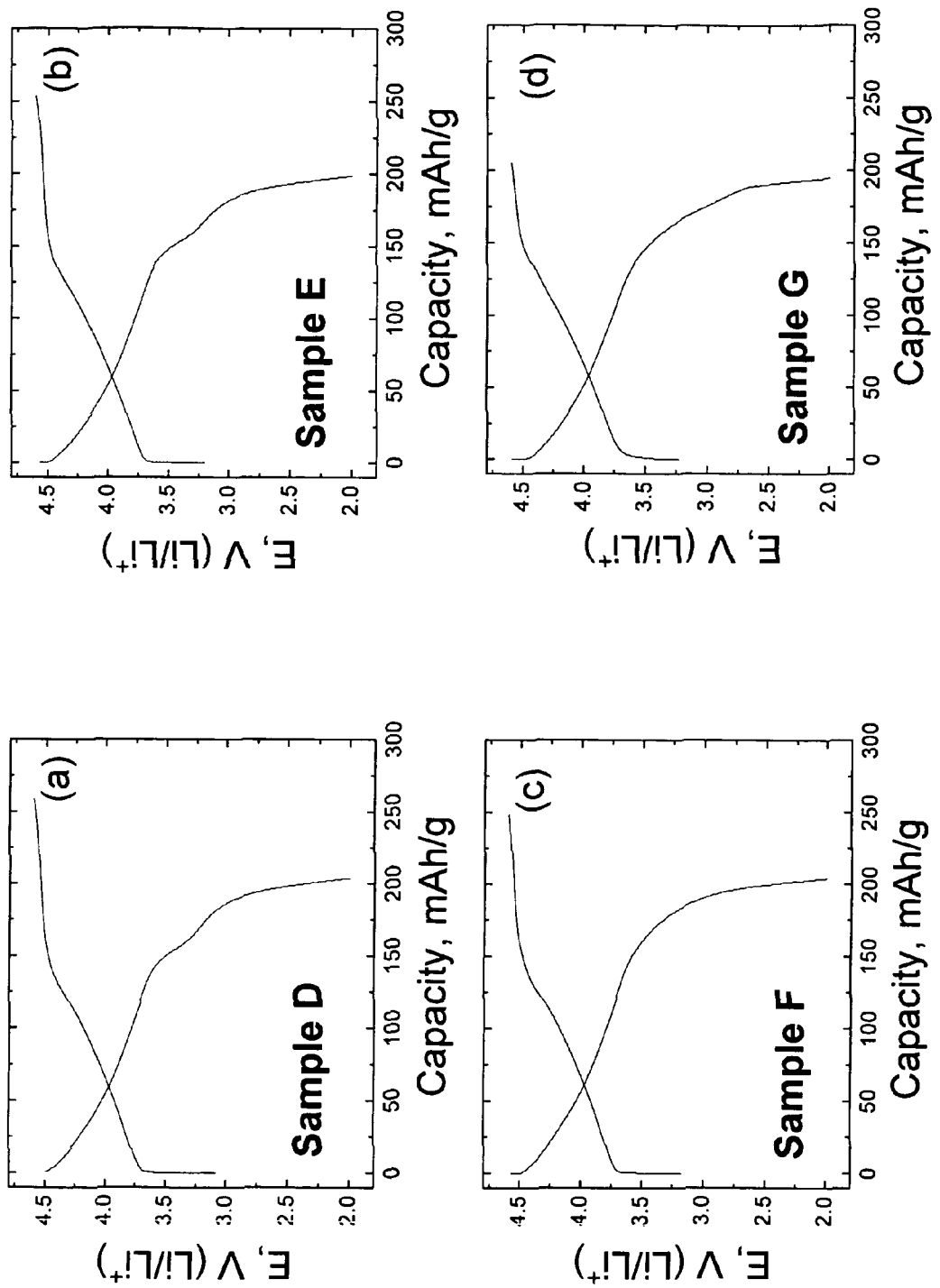
FIG. 9a illustrates the first charge and discharge voltage profiles of a lithium cell, operated at room temperature, with a $0.3Li_2MnO_3 \cdot 0.7LiMn_{0.5}Ni_{0.5}O_2$ composite electrode.
FIG. 9b illustrates the first charge and discharge voltage profiles of a lithium cell, operated at room temperature, with a $0.3Li_2MnO_3 \cdot 0.7LiMn_{0.5}Ni_{0.5}O_2$ composite electrode treated with $NH_3$.
FIG. 9c illustrates the first charge and discharge voltage profiles of a lithium cell, operated at room temperature, with a $0.3Li_2MnO_3 \cdot 0.7LiMn_{0.5}Ni_{0.5}O_2$ composite electrode treated with $H_2O$ and $NH_3$.
FIG. 9d illustrates the first charge and discharge voltage profiles of a lithium cell, operated at room temperature, with a $0.3Li_2MnO_3 \cdot 0.7LiMn_{0.5}Ni_{0.05}O_2$ composite electrode treated with $HNO_3$ and $NH_3$.

The voltage profiles of the first charge/discharge cycle of lithium cells with:

an untreated $0.3Li_2MnO_3 \cdot 0.7LiMn_{0.5}Ni_{0.5}O_2$ electrode (Sample D);

an $NH_3$-treated $0.3Li_2MnO_3 \cdot 0.7LiMn_{0.5}Ni_{0.5}O_2$ electrode (Sample E);

an $H_2O/NH_3$-treated $0.3Li_2MnO_3 \cdot 0.7LiMn_{0.5}Ni_{0.5}O_2$ electrode (Sample F); and an $HNO_3/NH_3$-treated $0.3Li_2MnO_3 \cdot 0.7LiMn_{0.5}Ni_{0.05}O_2$ electrode (Sample G)

are shown in FIG. 9(a-d), respectively.

Figure 10:
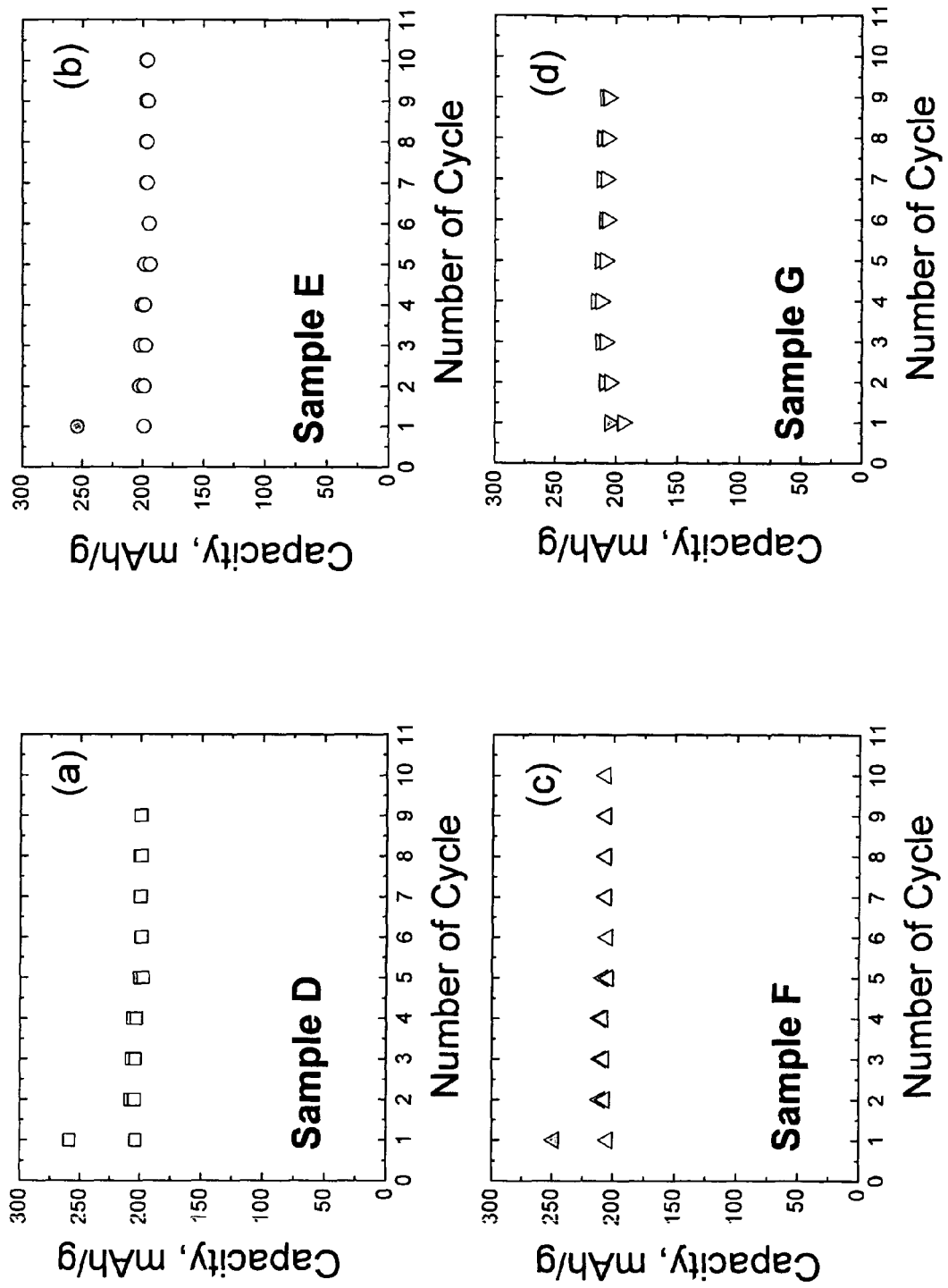
FIG. 10a illustrates a plot of electrode capacity vs. cycle number of a lithium cell, operated at room temperature between 4.6 and 2.0 V, with an untreated $0.3Li_2MnO_3 \cdot 0.7LiMn_{0.5}Ni_{0.5}O_2$ composite electrode.
FIG. 10b illustrates a plot of electrode capacity vs. cycle number of a lithium cell, operated at room temperature between 4.6 and 2.0 V, with a $0.3Li_2MnO_3 \cdot 0.7LiMn_{0.5}Ni_{0.05}O_2$ composite electrode treated with $NH_3$.
FIG. 10c illustrates a plot of electrode capacity vs. cycle number of a lithium cell, operated at room temperature between 4.6 and 2.0 V, with a $0.3Li_2MnO_3 \cdot 0.7LiMn_{0.5}Ni_{0.5}O_2$ composite electrode treated with $H_2O$ and $NH_3$.
FIG. 10d illustrates a plot of electrode capacity vs. cycle number of a lithium cell, operated at room temperature between 4.6 and 2.0 V, with a $0.3Li_2MnO_3 \cdot 0.7LiMn_{0.5}Ni_{0.05}O_2$ composite electrode treated with $HNO_3$ and $NH_3$.

The capacities obtained during the first charge and discharge and the cycling efficiency of the initial cycle of these cells are provided in Table 2 and illustrated graphically in FIG. 10(a-d), respectively.

TABLE 3

Charge/discharge capacities and reversible capacity (%) of the initial cycle of lithium cells with $0.3Li_2MnO_3 \cdot 0.7LiMn_{0.5}Ni_{0.5}O_2$ and preconditioned $0.3Li_2MnO_3 \cdot 0.7LiMn_{0.5}Ni_{0.5}O_2$ electrodes.

| Electrode | Initial Charge Capacity (mAh/g) | Initial Discharge Capacity (mAh/g) | Reversible Capacity (%) |
|---|---|---|---|
| Sample D | 259 | 203 | 78 |
| Sample E | 254 | 199 | 78 |
| Sample F | 248 | 204 | 82 |
| Sample G | 205 | 195 | 95 |

The data in Table 3 demonstrate that an improvement in the irreversible capacity loss during the initial cycle can be obtained by preconditioning $xLi_2M'O_3 \cdot (1-x)LiMO_2$ composite electrodes, particularly those containing a $Li_2MnO_3$ component by subjecting the electrodes to an acidic medium, e.g., deionized water (pH~6.5) or an $HNO_3$ solution (pH~1.8) and that the improvement is significantly more pronounced when the electrodes are preconditioned with acid at low pH (Sample G, 95% efficiency). The excellent 95% capacity retention of electrode sample G when charged to the high potential of 4.6 V vs. $Li^0$ is indicative of a stabilized electrode with a significantly reduced surface reactivity compared with electrode samples D, E and F.

Example 5

Figure 13:
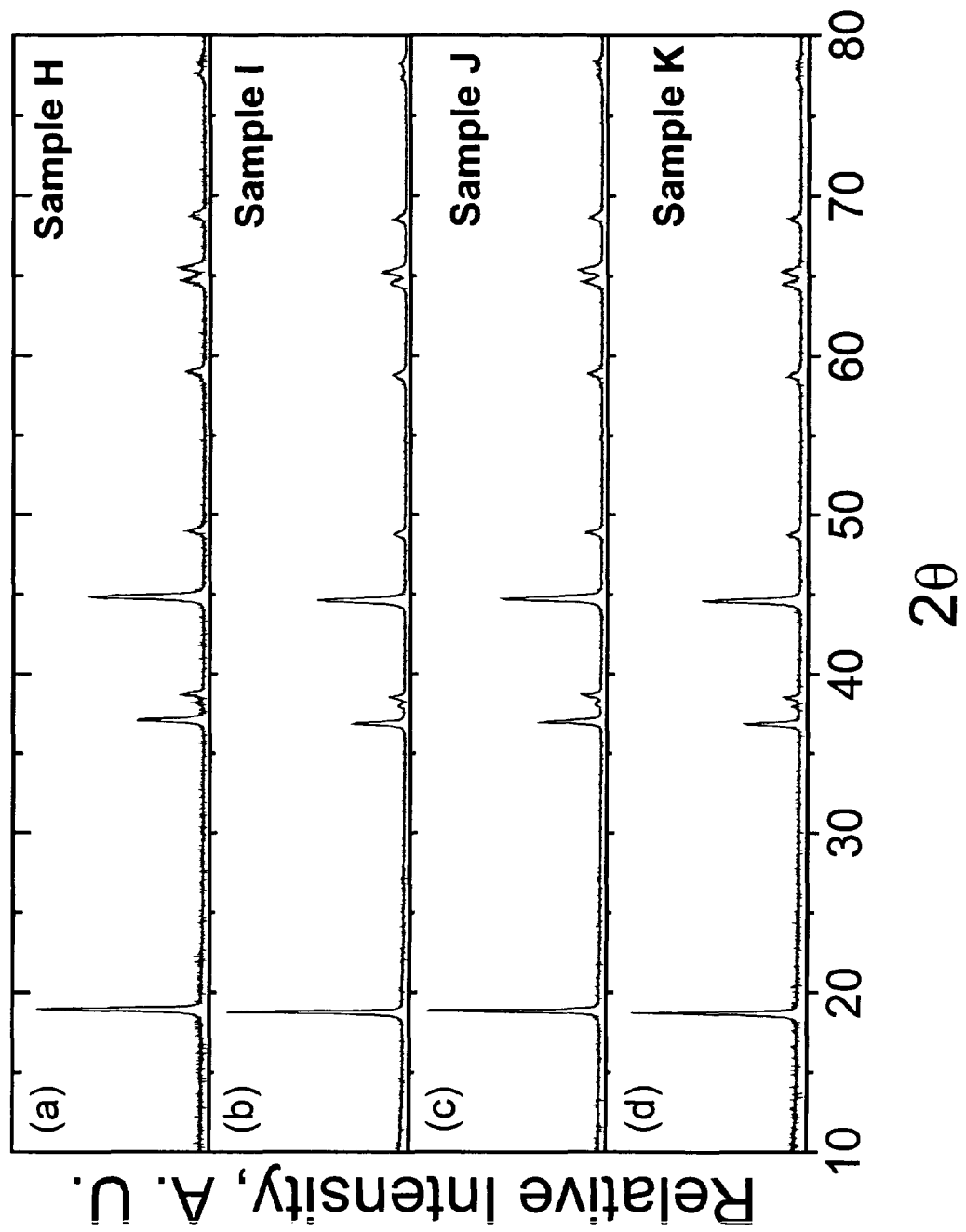
FIG. 13 illustrates the powder X-ray diffraction patterns of:
a) an untreated $0.1Li_2MnO_3 \cdot 0.9LiCo_{0.372}Ni_{0.372}Mn_{0.256}O_2$ electrode (Sample H)

An electrode material with the formula $0.1Li_2MnO_3 \cdot 0.9LiCo_{0.372}Ni_{0.372}Mn_{0.256}O_2$ was prepared as follows. The $(Mn_{0.330}Ni_{0.335}Co_{0.335})(OH)_x$ (x~2) precursor was prepared by coprecipitation in a similar manner to the procedure described in Example 1. $Li_2CO_3$ was intimately with the $(Mn_{0.330}Ni_{0.335}Co_{0.335})(OH)_x$ (x~2) precursor in a ratio of ratio $Li_2CO_3$:$(Mn_{0.330}Ni_{0.335}Co_{0.335})(OH)_x$=0.55:1 (or Li:(Mn+Ni+Co)=1.1:1). The powder mixture was calcined at 700° C. for 16 hours in air and then at 950° C. for 12 hours in air to make $0.1Li_2MnO_3 \cdot 0.9LiCo_{0.372}Ni_{0.372}Mn_{0.256}O_2$ (Sample H). A $0.1Li_2MnO_3 \cdot 0.9LiCo_{0.372}Ni_{0.372}Mn_{0.256}O_2$ sample was treated with an acidic 0.014M $NH_4F$ (aqueous) solution, the pH of which was 5.54, and thereafter dried at either at 300° C. or 600° C. in air for 6 hours (Samples I and J, respectively). A $0.1Li_2MnO_3 \cdot 0.9LiCu_{0.372}Ni_{0.372}Mn_{0.256}O_2$ sample was also treated with a 0.016M $NH_4F$ solution in laboratory grade methanol containing trace amounts of water (typically up to 0.1%), the pH of which was 6.24, and thereafter dried at 600° C. in air for 6 hours (Sample K). The X-ray diffraction patterns of Samples H, I, J and K are shown in FIG. 13(a-d). There were no significant differences in the X-ray patterns of Samples H, I, J and K, indicating that no significant changes had occurred to the bulk structure of the individual compounds during the preconditioning reactions.

Example 6

Electrochemical Evaluation of $0.1Li_2MnO_3 \cdot 0.9LiCo_{0.372}Ni_{0.372}Mn_{0.256}O_2$ Electrodes The construction of lithium cells containing $0.1Li_2MnO_3 \cdot 0.9LiCo_{0.372}Ni_{0.372}Mn_{0.256}O_2$ electrodes of Example 5 was carried out in a similar manner to the procedure described in Example 2. Cells were cycled galvanostatically between 4.6 and 3.0 V at constant current density (first two cycles at 0.1 mA/cm² and following cycles at 0.5 mA/cm²).

The voltage profiles of the first charge/discharge cycle of lithium cells with an untreated $0.1Li_2MnO_3 \cdot 0.9LiCo_{0.372}Ni_{0.372}Mn_{0.256}O_2$ electrode; a $0.1 Li_2MnO_3 \cdot 0.9LiCo_{0.372}Ni_{0.372}Mn_{0.256}O_2$ electrode treated with an acidic $NH_4F$ solution (aqueous) and dried at 300° C.; a $0.1Li_2MnO_3 \cdot 0.9LiCo_{0.372}Ni_{0.372}Mn_{0.256}O_2$ electrode treated with an acidic $NH_4F$ solution (aqueous) and subsequently dried at 600° C.; and a $0.1 Li_2MnO_3 \cdot 0.9LiCo_{0.372}Ni_{0.372}Mn_{0.256}O_2$ electrode treated with an acidic $NH_4F$ solution (methanol+trace $H_2O$) and subsequently dried at 600° C. are shown in FIG. 14(a-d), respectively. The capacities obtained during the first charge and discharge and the cycling efficiency of the initial cycle of these cells are provided in Table 4; the cycling stability of the untreated electrode and preconditioned electrodes is shown more graphically in the capacity vs. cycle number plots (30 cycles) in FIG. 15.

TABLE 4

Charge/discharge capacities and reversible capacity (%) of the initial cycle of lithium cells with $0.1Li_2MnO_3 \cdot 0.9LiCo_{0.372}Ni_{0.372}Mn_{0.256}O_2$ and preconditioned $0.1Li_2MnO_3 \cdot 0.9LiCo_{0.372}Ni_{0.372}Mn_{0.256}O_2$ electrodes.

| Electrode | Initial Charge Capacity (mAh/g) | Initial Discharge Capacity (mAh/g) | Reversible Capacity (%) |
|---|---|---|---|
| Sample H | 230 | 184 | 80.1 |
| Sample I | 230 | 194 | 84.4 |
| Sample J | 233 | 197 | 84.5 |
| Sample K | 228 | 189 | 83.3 |

The electrochemical data of Example 6 are fully consistent with the principles of this invention. The data demonstrate that when $xLi_2M'O_3 \cdot (1-x)LiMO_2$ ($0 \leq x<1$) electrodes, as represented by $0.1 Li_2MnO_3 \cdot 0.9LiCo_{0.372}Ni_{0.372}Mn_{0.256}O_2$, are chemically preconditioned prior to cell assembly in a proton-containing, acidic solution with a pH<7.0, the capacity, cycling efficiency and cycling stability of lithium cells, when charged to high potentials, are improved. For example, the improved coulombic efficiencies of the initial charge/discharge cycle of cells with preconditioned electrodes Samples I, J, and K (83.3-84.5%) when charged to the high potential of 4.6 V vs. $Li^0$ are indicative of stabilized electrodes with reduced surface reactivity compared to that of the untreated control sample H (80.1%). Furthermore, the capacity vs. cycling plots in FIG. 15 provide unequivocal evidence that higher electrochemical capacities can be obtained from acid-treated electrodes Samples I, J and K on cycling and, moreover, that improved cycling stability can be achieved by using acidic media in which the salt of a relatively strong acid and a relatively weak base, such as $NH_4F$, is dissolved in a non-aqueous solvent such as an alcohol, for example, methanol, as in Sample K. In this respect, it should be noted that alcohols are readily miscible with water, and therefore are likely to contain trace amounts of $H_2O$, even when in high purity form. Because of the miscibility of water with non-aqueous solvents such as methanol, ethanol, or the like, it therefore stands to reason and is obvious to those skilled in the art that the amount of water in such co-solvents can be tailored to control the pH of the acid solution (pH<7) for the purposes of this invention. The invention therefore includes using acidic solutions of salts dissolved in one or more aqueous or non-aqueous solvents, such as ammonium salts $NH_4NO_3$, $NH_4C_1$, $NH_4F$, and $NH_4HF_2$ ($NH_4F \cdot HF$) dissolved in methanol, ethanol, or the like, to provide acidic solutions having a pH<7.0, to precondition the electrodes and prior to heating the electrodes above 100° C., but preferably below 600° C., in order to completely dry the electrodes and to stabilize the electrode surface as effectively as possible.

Although the precise reasons for the improved electrochemical behavior of Samples I, J and K over Sample H are not yet fully understood, the applicants believe that amongst the major reasons for the improved behavior brought about by the preconditioning reactions are: 1) a greater stability of the preconditioned electrode surface, 2) possible $H^+$—$Li^+$ ion-exchange reactions and 3) a removal of some lithia ($Li_2O$) from the $xLi_2M'O_3$ component of the electrode structure, as described hereinbefore. It is also well known that $NH_3$ or $NH_4$-bearing species can act as reducing agents, and therefore that reduction of the electrode surface can occur, particularly when the electrodes are dried at elevated temperatures. Moreover, when acids such as $HNO_3$, HCl and HF are used, then the replacement of divalent surface oxygen ions, $O^{2-}$, by monovalent $NO_3^-$, $Cl^-$ or $F^-$ ions would have the effect of reducing the nearest neighbor transition metal ions (M and M') of the $xLi_2M'O_3 \cdot (1-x)LiMO_2$ ($0 \leq x<1$) electrode structure. In this respect, transition metal oxy-nitrato, oxychloride and oxyfluoride compounds are already known to exist, such as $FeONO_3$, $TiO(NO_3)_2$, FeOCl, FeOF, $VOCl_2$ and VOF, and it is therefore believed that such oxy-nitrato-, oxychloride- and oxyfluoride species may form at least at the electrode surfaces of this invention, thereby imparting greater structural stability to these surfaces and reducing the reactivity of the electrode surfaces towards the electrolyte at high potentials, typically above 4.2 or 4.3 V. The same principles may also apply, in likewise fashion, to other inorganic acids and organic acids, such as phosphoric acid, sulfuric acid and acetic acid.

Figure 11:
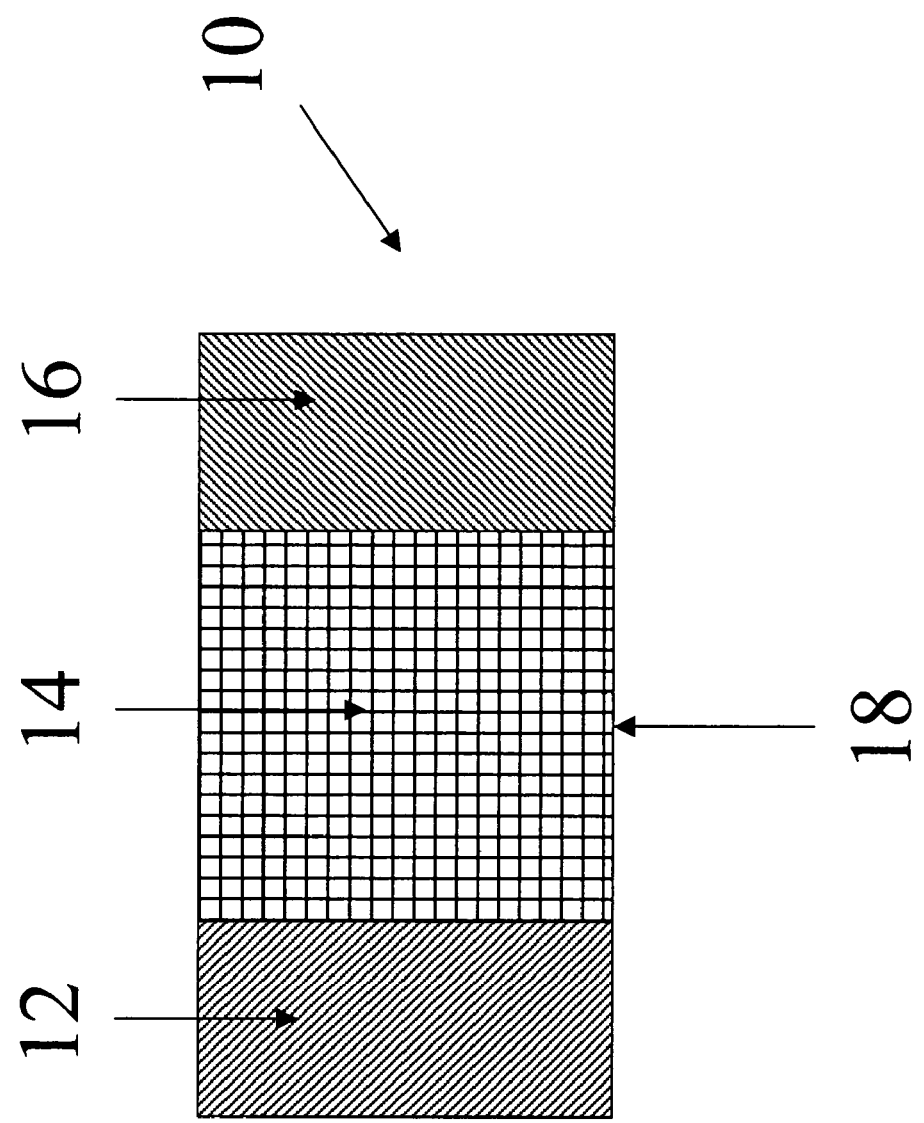
FIG. 11 illustrates a schematic representation of an electrochemical cell.
Figure 12:
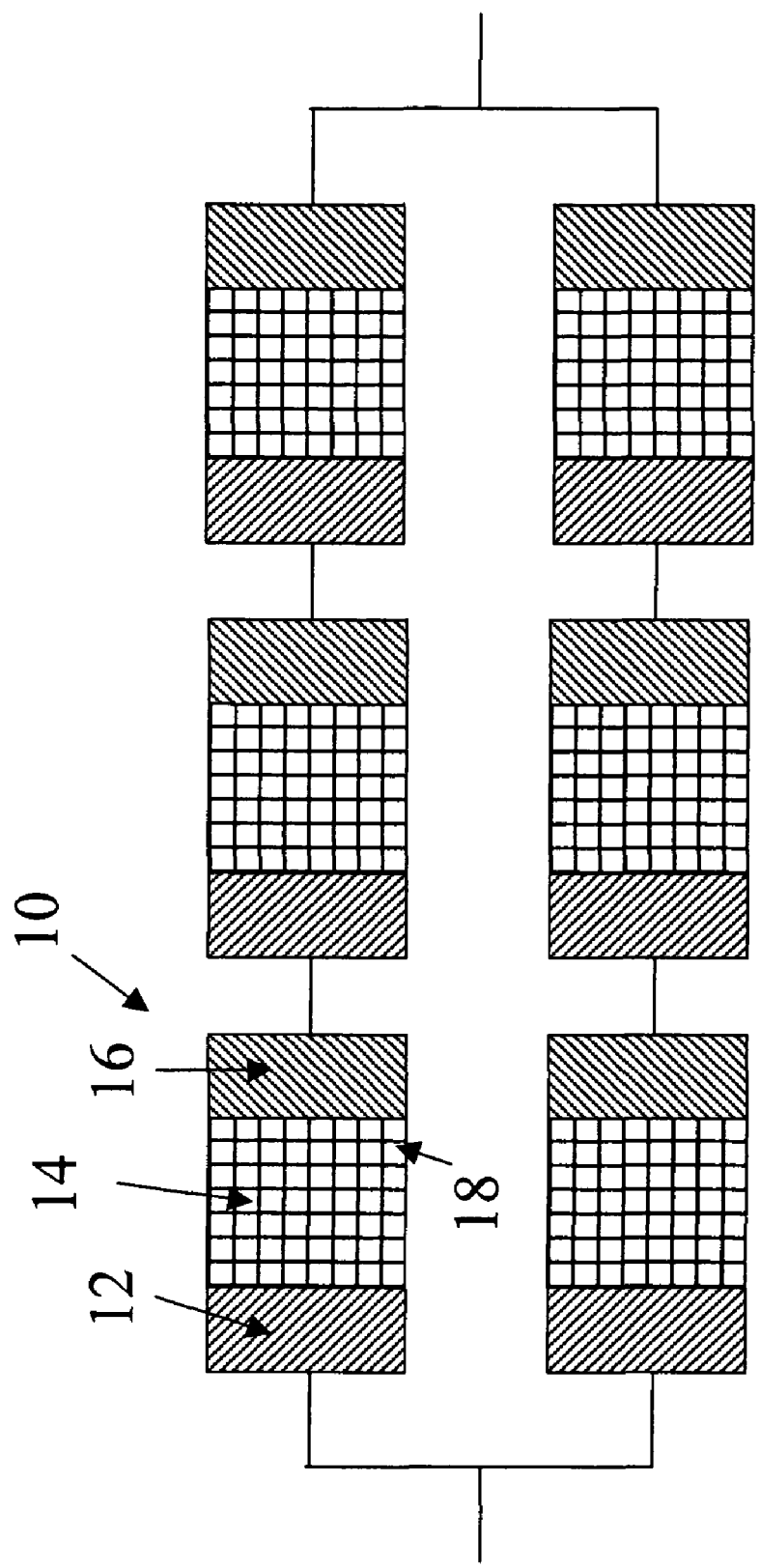
FIG. 12 illustrates a schematic representation of a battery consisting of a plurality of cells connected electrically in series and in parallel.

The examples and results of this invention demonstrate that improved electrochemical performance of layered lithium metal oxide electrodes as defined herein, can be significantly improved by preconditioning the electrodes either with a reducing agent such as ammonia or by acid treatment or a combination thereof, particularly when the electrodes are subjected to high potentials in excess of 4.2 V during charge. This invention, therefore, also relates to non-aqueous electrochemical lithium cells containing such preconditioned positive electrodes, a typical cell shown schematically in FIG. 11, represented by the numeral 10 having a negative electrode 12 separated from a positive electrode 16 by an electrolyte 14, all contained in an insulating housing 18 with suitable terminals (not shown) being provided in electronic contact with the negative electrode 12 and the positive electrode 16. Binders and other materials normally associated with both the electrolyte and the negative and positive electrodes are well known in the art and are not fully described herein, but are included as is understood by those of ordinary skill in this art. FIG. 12 shows a schematic illustration of one example of a battery in which two strings of electrochemical lithium cells, described above, are arranged in parallel, each string comprising three cells arranged in series. The invention also includes methods of making the preconditioned positive electrodes, cells and batteries including same.

While there has been disclosed what is considered to be the preferred embodiments of the present invention, it is understood that various changes in the details may be made without departing from the spirit, or sacrificing any of the advantages of the present invention and that additional improvements in the capacity and stability of the electrodes can be expected to be made in the future by improving and optimizing the processing techniques whereby lithium metal oxide electrodes are chemically preconditioned either by acid treatment or The embodiments of the invention in which an exclusive property or privilege is claimed are defined as follows:

1. An electrode for a non-aqueous lithium cell, comprising a lithium metal oxide having the formula $xLi_{2-y}H_yO.xM'O_2.(1-x)Li_{1-z}H_zMO_2$ in which $0<x<1$, $0<y<1$ and $0<z<1$ made from a lithium metal oxide precursor material having the formula $xLi_2M'O_3.(1-x)LiMO_2$, in which $0 \leq x<1$, and in which M is a non-lithium metal ion with an average trivalent oxidation state selected from two or more first-row transition metals or lighter metal elements in the periodic table, and M' is one or more ions with an average tetravalent oxidation state selected from the first- and second-row transition metal elements and Sn, the $xLi_{2-y}H_yO.xM'O_2.(1-x)Li_{1-z}H_zMO_2$ being made by preconditioning the precursor material in a proton-containing medium with a pH<7.0 including one or n-tore of phosphoric acid, sulfuric acid, nitric acid, acetic acid, hydrochloric acid or hydrofluoric acid.

2. The electrode of claim 1, in which M is selected from Co, Ni, Mn, Ti, Mg and Al, and M' is selected from Ti, Mn, Zr, Ru and Sn.

3. The electrode of claim 2, in which M is selected from Co, Ni and Mn, and M' is selected from Ti and Mn.

4. The electrode of claim 3, in which M is selected from Co, Ni and Mn, and M' is selected from Mn.

5. The electrode of claim 4, in which M is selected from Ni and Mn, and M' is selected from Mn.

6. A method of synthesizing the electrode of claim 1 by subjecting the $xLi_2M'O_3.(1-x)LiMO_2$ precursor material to an acidic solution with pH<7.0, and thereafter heating the electrode in air above 100° C.

7. The method according to claim 6 in which the electrode is heated below 600° C.

8. The method according to claim 7 in which the electrode is heated below 400° C.

9. The method according to claim 6 in which the proton-containing medium consists of de-ionized water and one or more of an inorganic acid.

10. An electrode made according to the method of claim 6.

11. A method of synthesizing the electrode of claim 1 by subjecting the $xLi_2M'O_3.(1-x)LiMO_2$ precursor material to an acidic solution with pH<7.0, containing an ammonium salt dissolved in one or more aqueous or non-aqueous solvents and thereafter heating the electrode in air above 100° C.

12. The method of claim 11, in which the acidic solution is $NH_4F$ or $NH_4HF_2$ dissolved in water or an alcohol.

13. The method of claim 12, in which the $NH_4F$ salt is dissolved in methanol.

14. The method of claim 13, in which the $NH_4F$ salt is dissolved in methanol and thereafter heating the electrode in air at 600° C.

15. An electrode made according to the method of claim 11.

16. A non-aqueous lithium electrochemical cell comprising a negative electrode, an electrolyte and an uncycled positive electrode comprising a lithium metal oxide having the formula $xLi_{2-y}H_yO.xM'O_2.(1-x)Li_{1-z}H_zMO_2$ in which $0<x<1$, $0<y<1$ and $0<z<1$ made from a lithium metal oxide precursor material having the formula $xLi_2M'O_3.(1-x)LiMO_2$, in which $0 \leq x<1$, and in which M is a non-lithium metal ion with an average trivalent oxidation state selected from two or more first-row transition metals or lighter metal elements in the periodic table, and M' is one or more ions with an average tetravalent oxidation state selected from the first- and second-row transition metal elements and Sn, said $xLi_{2-y}H_yO.xM'O_2.(1-x)Li_{1-z}H_zMO_2$ being made by preconditioning the precursor material in a proton-containing medium with a pH<7.0 containing an inorganic acid.

17. A non-aqueous lithium battery comprising a plurality of electrically connected electrochemical cells, each cell having a negative electrode, an electrolyte and an uncycled positive electrode comprising a lithium metal oxide having the formula $xLi_{2-y}H_yO.xM'O_2.(1-x)Li_{1-z}H_zMO_2$ in which $0<x<1$, $0<y<1$ and $0<z<1$ made from a lithium metal oxide precursor material having the formula $xLi_2M'O_3.(1-x)LiMO_2$, in which $0 \leq x<1$, and in which M is a non-lithium metal ion with an average trivalent oxidation state selected from two or more first-row transition metals or lighter metal elements in the periodic table, and M' is one or more ions with an average tetravalent oxidation state selected from the first- and second-row transition metal elements and Sn, said $xLi_{2-y}H_yO.xM'O_2.(1-x)Li_{1-z}H_zMO_2$ being made by preconditioning the precursor material in a proton-containing medium with a pH<7.0 containing an inorganic acid.

18. The non-aqueous lithium electrochemical cell of claim 16, wherein said proton-containing medium contains fluoride ions, phosphate ions, or a combination thereof.

19. The non-aqueous lithium battery of claim 17, wherein said proton-containing medium contains fluoride ions, phosphate ions, or a combination thereof.

* * * * *

UNITED STATES PATENT AND TRADEMARK OFFICE
CERTIFICATE OF CORRECTION

PATENT NO. : 7,732,096 B2
APPLICATION NO. : 11/378145
DATED : June 8, 2010
INVENTOR(S) : Michael M. Thackeray et al.

It is certified that error appears in the above-identified patent and that said Letters Patent is hereby corrected as shown below:

Title Page (57) ABSTRACT

Line 3, delete "$xLi_2\text{-}yHyO.xM'O_2.(1\text{-}x)Li_1\text{-}zHzMO_2$" and insert
--$xLi_{2\text{-}y}H_yO \cdot xM'O_2 \cdot (1\text{-}x)Li_{1\text{-}z}H_zMO_2$--;

Line 4, delete "anon-lithium" and insert --a non-lithium--;

Line 9, delete "$xLi_2\text{-}$";

Line 10, delete "$yH_y.xM'O_2.(1\text{-}x)Li_1\text{-}zH_zMO_2$" and insert
--$xLi_{2\text{-}y}H_yO \cdot M'O_2 \cdot (1\text{-}x)Li_{1\text{-}z}H_zMO_2$--.

Signed and Sealed this

Twenty-fourth Day of August, 2010

David J. Kappos
*Director of the United States Patent and Trademark Office*